(12) United States Patent
James et al.

(10) Patent No.: US 8,602,451 B2
(45) Date of Patent: *Dec. 10, 2013

(54) AIRBAG FRAME APPARATUS

(71) Applicant: Judco Manufacturing, Inc., Harbor City, CA (US)

(72) Inventors: Stephen James, Highland Park, CA (US); Thomas E. Buttner, Palos Verdes Estates, CA (US)

(73) Assignee: Judco Manufacturing, Inc., Harbor City, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/922,156

(22) Filed: Jun. 19, 2013

(65) Prior Publication Data

US 2013/0277951 A1 Oct. 24, 2013

Related U.S. Application Data

(63) Continuation of application No. 13/033,499, filed on Feb. 23, 2011, now Pat. No. 8,491,003.

(60) Provisional application No. 61/307,349, filed on Feb. 23, 2010.

(51) Int. Cl.
*B60R 21/203* (2006.01)
*B60Q 5/00* (2006.01)

(52) U.S. Cl.
USPC ........................................ 280/731; 200/61.54

(58) Field of Classification Search
USPC ................ 280/728.2, 731; 200/61.54, 61.55, 200/61.56, 61.57, 239, 243, 245, 341, 344, 200/345; 74/484 R, 552; 411/353, 508, 509, 411/516, 517, 518
See application file for complete search history.

(56) References Cited

U.S. PATENT DOCUMENTS

| 2,667,083 A | 1/1954 | Russell |
| 4,785,144 A | 11/1988 | Fosnaugh et al. |

(Continued)

FOREIGN PATENT DOCUMENTS

| WO | 2007060848 A1 | 5/2007 |
| WO | 2009044734 A1 | 4/2009 |

OTHER PUBLICATIONS

"Engage" Definition, Automotive Dictionary, available at http://www.motorera.com/dictionary/EN.HTM (last visited Jul. 23, 2012), 1p.

(Continued)

*Primary Examiner* — Joseph Rocca
(74) *Attorney, Agent, or Firm* — Michael Zarrabian, Esq.; Sherman & Zarrabian LLP

(57) ABSTRACT

An apparatus includes a frame configured for supporting a vehicle airbag device. Support assemblies are movably connected to the frame. Each support assembly includes an airbag connecting member engaging a spring member. Pressing the airbag connecting member towards the frame compresses the spring member. An electrical switch assembly is connected to the frame. The electrical switch assembly includes at least one push button electrical switch for connecting to an electrical circuit. Pressing at least one support assembly a predetermined distance lowers a portion of the at least one support assembly towards the frame for urging a vehicle airbag device capable of being connected to a connecting end of each airbag connecting member, against at least one switch in the electrical switch assembly.

20 Claims, 22 Drawing Sheets

(56) References Cited

U.S. PATENT DOCUMENTS

| | | | |
|---|---|---|---|
| 4,963,704 | A | 10/1990 | Buma et al. |
| 5,283,404 | A | 2/1994 | Prescaro, Jr. |
| 5,331,124 | A | 7/1994 | Danielson |
| 5,350,190 | A | 9/1994 | Szigethy |
| 5,410,114 | A | 4/1995 | Furuie et al. |
| 5,508,482 | A | 4/1996 | Martin et al. |
| 5,630,611 | A | 5/1997 | Goss et al. |
| 5,639,113 | A | 6/1997 | Goss et al. |
| 5,931,492 | A | 8/1999 | Mueller et al. |
| 6,008,460 | A | 12/1999 | Demari |
| 6,161,863 | A | 12/2000 | Fujita et al. |
| 6,364,344 | B2 | 4/2002 | Hudd et al. |
| 6,474,682 | B2 | 11/2002 | Ikeda et al. |
| 6,478,330 | B2 | 11/2002 | Fujita |
| 6,600,114 | B2 | 7/2003 | Kikuta et al. |
| 6,867,690 | B2 | 3/2005 | Gioutsos et al. |
| 6,951,348 | B2 | 10/2005 | Enders |
| 6,953,204 | B2 | 10/2005 | Xu et al. |
| 7,121,581 | B2 | 10/2006 | Xu et al. |
| 7,159,897 | B2 | 1/2007 | Worrell et al. |
| 7,268,309 | B2 | 9/2007 | Sugimoto |
| 7,322,602 | B2 | 1/2008 | Tsujimoto et al. |
| 8,491,003 | B2 * | 7/2013 | James et al. .............. 280/731 |
| 2002/0125698 | A1 | 9/2002 | Schutz |
| 2002/0153708 | A1 | 10/2002 | Kreuzer |
| 2004/0026908 | A1 | 2/2004 | Schneider et al. |
| 2004/0052611 | A1 | 3/2004 | Liu |
| 2006/0131851 | A1 | 6/2006 | Tsujimoto et al. |
| 2006/0197323 | A1 | 9/2006 | Pillsbury et al. |
| 2007/0071578 | A1 | 3/2007 | Shinozaki et al. |
| 2008/0100040 | A1 | 5/2008 | DePottey et al. |
| 2009/0079168 | A1 | 3/2009 | Umemura et al. |
| 2009/0085334 | A1 | 4/2009 | Matsu et al. |
| 2009/0261560 | A1 | 10/2009 | Nakagawa et al. |
| 2010/0066062 | A1 | 3/2010 | Suzuki et al. |
| 2010/0224465 | A1 | 9/2010 | Hayashi et al. |

OTHER PUBLICATIONS

Bracket Definition, Merriam-Webster's Collegiate Dictionary, p. 137 (10th ed. 2000).

U.S. Non-Final Office Action dated Jul. 25, 2012 for U.S. Appl. No. 13/033,499.

U.S. Final Office Action dated Dec. 10, 2012 for U.S. Appl. No. 13/033,499.

U.S. Notice of Allowance dated Mar. 19, 2013 for U.S. Appl. No. 13/033,499.

* cited by examiner

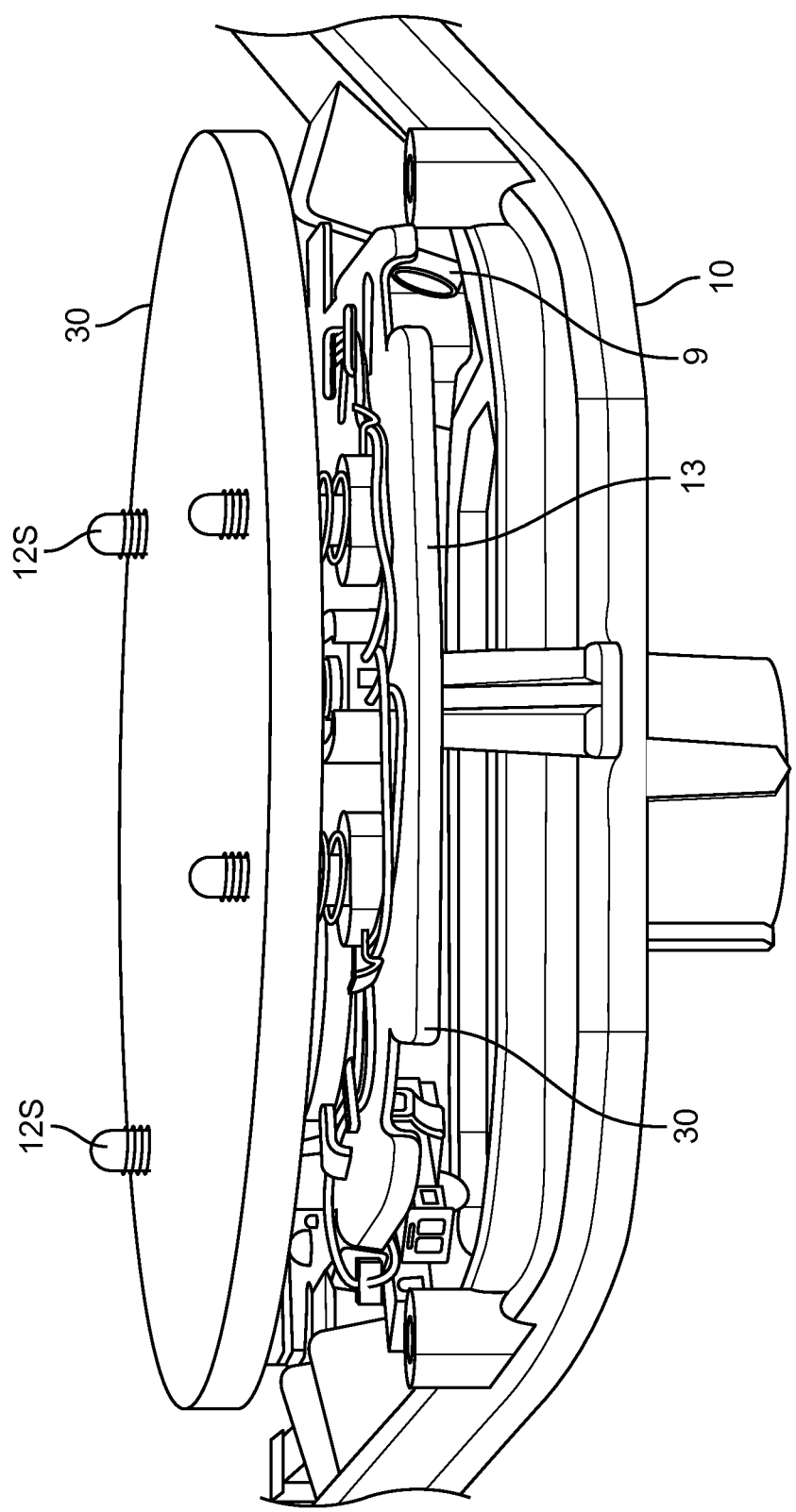

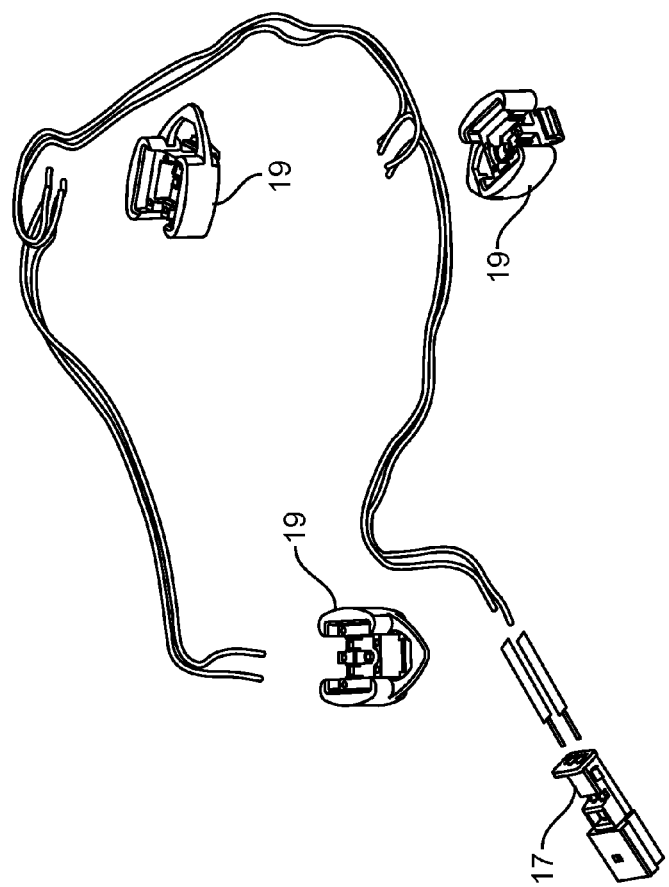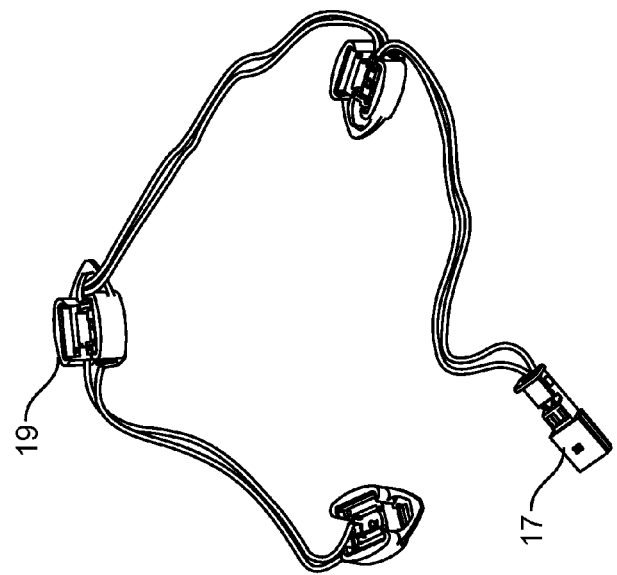
FIG. 20

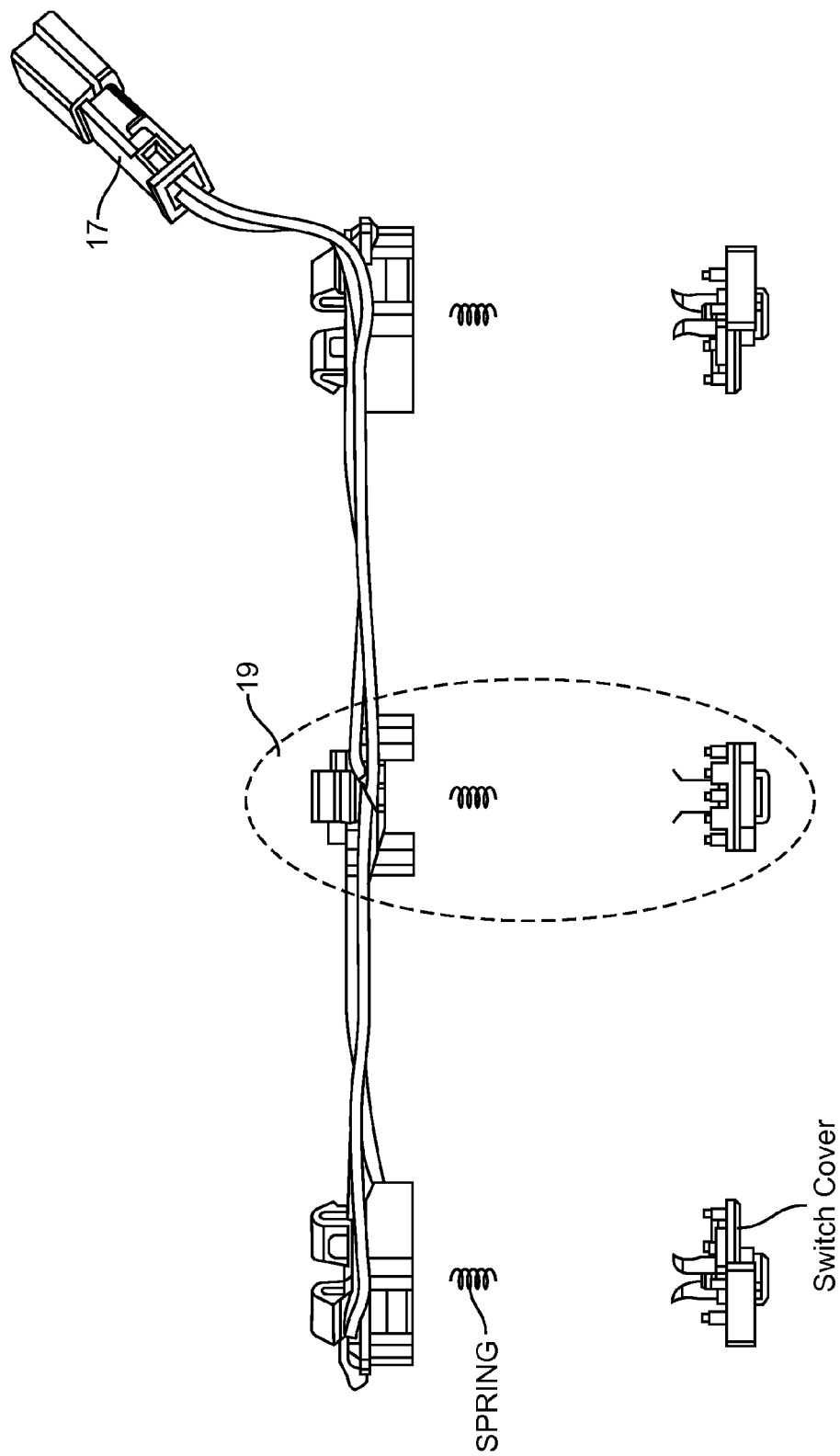

AIRBAG FRAME APPARATUS

CROSS-REFERENCES TO RELATED APPLICATIONS

This application is a continuation of U.S. patent application Ser. No. 13/033,499 filed on Feb. 23, 2011, which in turn claims priority from U.S. Provisional Patent Application Ser. No. 61/307,349, filed on Feb. 23, 2010, both incorporated herein by reference in their entirety.

BACKGROUND

1. Field of the Invention

The embodiments relate to air bag devices, and in particular, to air bag frames and systems.

2. Description of the Related Art

Airbags are used as safety equipment in vehicles, such as automobiles and trucks. Airbags are mounted in various places in vehicles, such as dashboards and steering wheels. The mounting of airbags in steering wheels protects a driver from contacting the hard surface of a steering wheel in an accident. The steering wheel mounted airbag can make placement of other vehicle features typically mounted to a steering wheel challenging.

SUMMARY

One embodiment of the invention comprises an apparatus including a frame configured for supporting a vehicle airbag device. Support assemblies are movably connected to the frame. Each support assembly includes an airbag connecting member engaging a spring member. Pressing the airbag connecting member towards the frame compresses the spring member. An electrical switch assembly is connected to the frame. The electrical switch assembly includes at least one push button electrical switch for connecting to an electrical circuit. Pressing at least one support assembly a predetermined distance lowers a portion of the at least one support assembly towards the frame for urging a vehicle airbag device capable of being connected to a connecting end of each airbag connecting member, against at least one switch in the electrical switch assembly.

Another embodiment of the invention comprises a system including a vehicle airbag assembly. A frame supports the vehicle airbag assembly. A support assembly is movably connected to the frame and the vehicle airbag assembly. The support assembly comprises an airbag coupling member engaging at least one spring member. Pressing the airbag coupling member towards the frame compresses the spring member. An electrical switch assembly is coupled to the frame. The electrical switch assembly comprises at least one push button electrical switch for coupling to an electrical circuit. Pressing the support assembly a predetermined distance lowers a portion of the support assembly towards the frame for urging the vehicle airbag assembly against the at least one push button electrical switch in the electrical switch assembly.

Yet another embodiment of the invention comprises a system including a vehicle airbag assembly. A frame is configured for supporting the vehicle airbag assembly and is removably coupled to a steering wheel. A plurality of airbag support assemblies movably coupled to the frame. Each support assembly comprises an airbag coupling member engaging a spring member. Pressing the airbag coupling member towards the frame compresses the spring member. An electrical horn switch assembly is coupled to the frame. Pressing at least one support assembly a predetermined distance lowers a portion of at least one support assembly towards the frame for urging a vehicle airbag device capable of being coupled to a coupling end of each airbag coupling member, against at least one switch in the electrical horn switch assembly for sounding a vehicle horn.

Other aspects and advantages of the present invention will become apparent from the following detailed description, which, when taken in conjunction with the drawings, illustrate by way of example the principles of the invention.

BRIEF DESCRIPTION OF THE DRAWINGS

The embodiments are illustrated by way of example, and not by way of limitation, in the Figures of the accompanying drawings and in which like reference numerals refer to similar elements and in which:

FIG. 18 illustrates a front perspective view of an airbag frame device coupled with an airbag assembly and steering wheel column/housing according to one embodiment of the invention;

FIG. 20 illustrates an isolated view of an electrical switch assembly for an airbag frame according to one embodiment of the invention;

FIG. 21 illustrates an isolated side view of the electrical switch assembly of FIG. 20 showing an exploded view of switches according to one embodiment of the invention;

DETAILED DESCRIPTION

The following description is made for the purpose of illustrating the general principles of the invention and is not meant to limit the inventive concepts claimed herein. Further, particular features described herein can be used in combination with other described features in each of the various possible combinations and permutations. Unless otherwise specifically defined herein, all terms are to be given their broadest possible interpretation including meanings implied from the specification as well as meanings understood by those skilled in the art and/or as defined in dictionaries, treatises, etc.

The description may disclose several preferred embodiments of an airbag frame apparatus and system, as well as operation and/or component parts thereof. While the following description will be described in terms of airbag frame systems and devices for clarity and to place the invention in context, it should be kept in mind that the teachings herein may have broad application to all types of systems, devices and applications.

One embodiment of the invention provides an airbag frame support device (apparatus) including a frame and support assemblies, wherein the frame is configured for supporting a vehicle airbag and mounting on the vehicle steering wheel. The support assemblies are coupled to the frame, wherein each support assembly includes a spring member. An electrical switch assembly comprising one or more electrical switches is also coupled to the frame, wherein the electrical switch assembly provides electrical connections to electrical components such as a horn.

Applying pressure on a support assembly for compressing the support assembly a predetermined distance lowers, and urges, at least a portion of the spring member of the support assembly towards a switch in the electrical switch assembly. The switch closes an electrical circuit that operates an electrical component. Removing pressure from the support assembly allows the spring member to decompress and move away from the switch, wherein the switch opens the electrical circuit.

Figure 1:
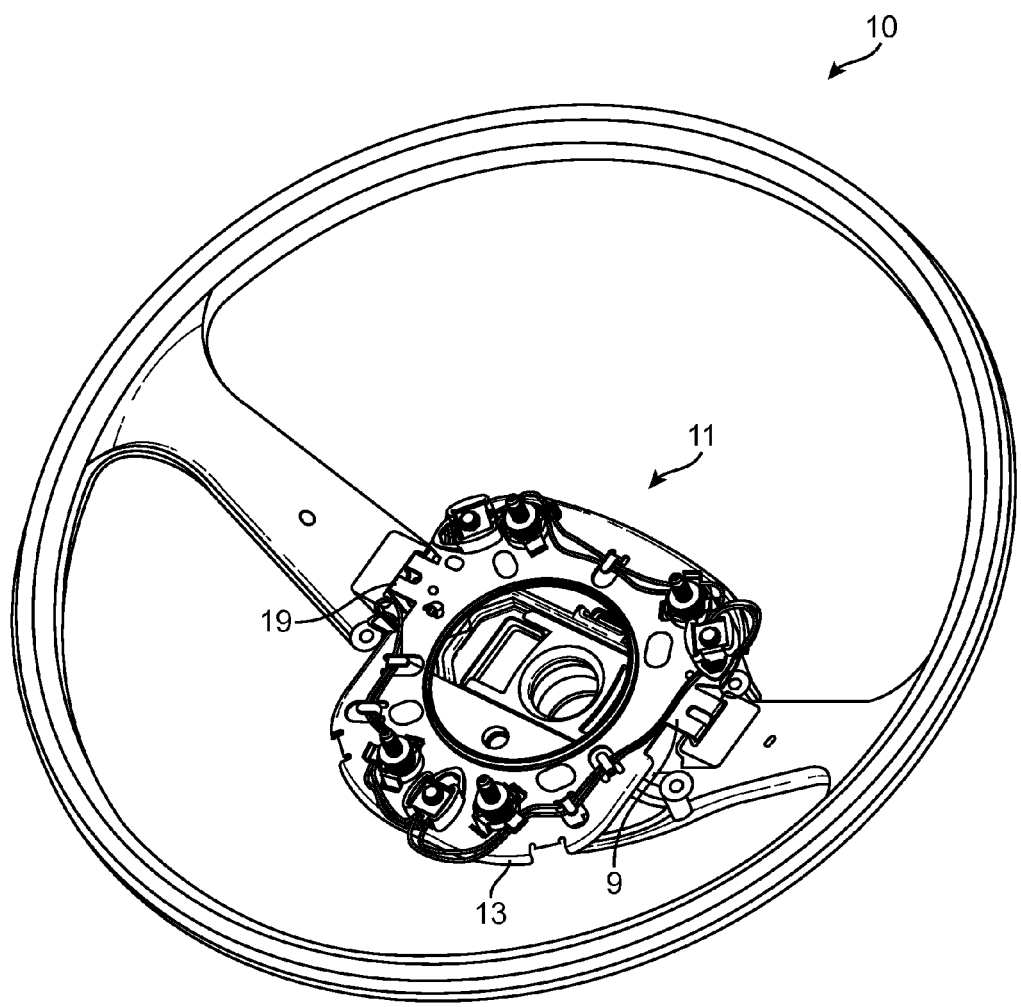
FIG. 1 illustrates a perspective view of an airbag frame device coupled with a steering wheel according to one embodiment of the invention.

FIG. 1 illustrates a perspective view of an airbag frame support device 11 coupled with a steering wheel 10 of a vehicle according to one embodiment of the invention. In one example, the airbag frame support device 11 is removably mounted/fastened to a central portion of the steering wheel 10 of a vehicle, such as an automobile, truck, etc.

Figure 2:
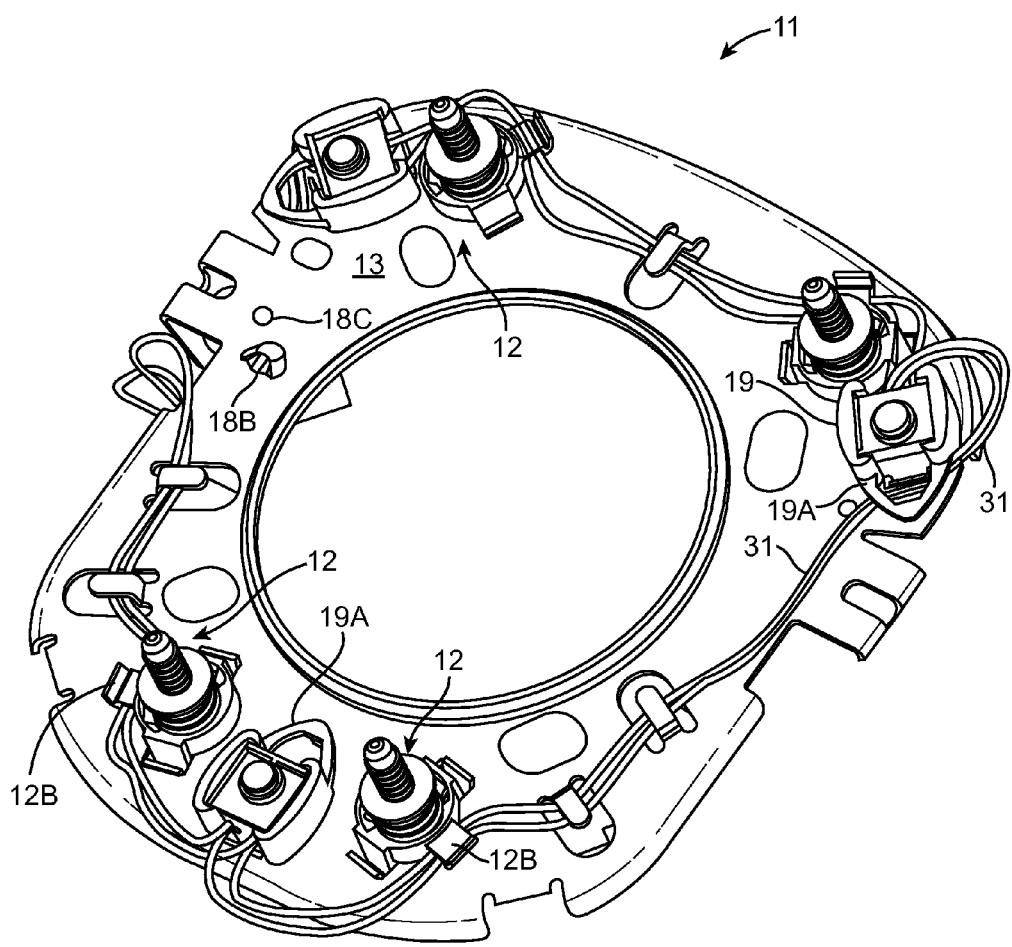
FIG. 2 illustrates a top perspective view of an airbag frame device according to one embodiment of the invention
Figure 7:
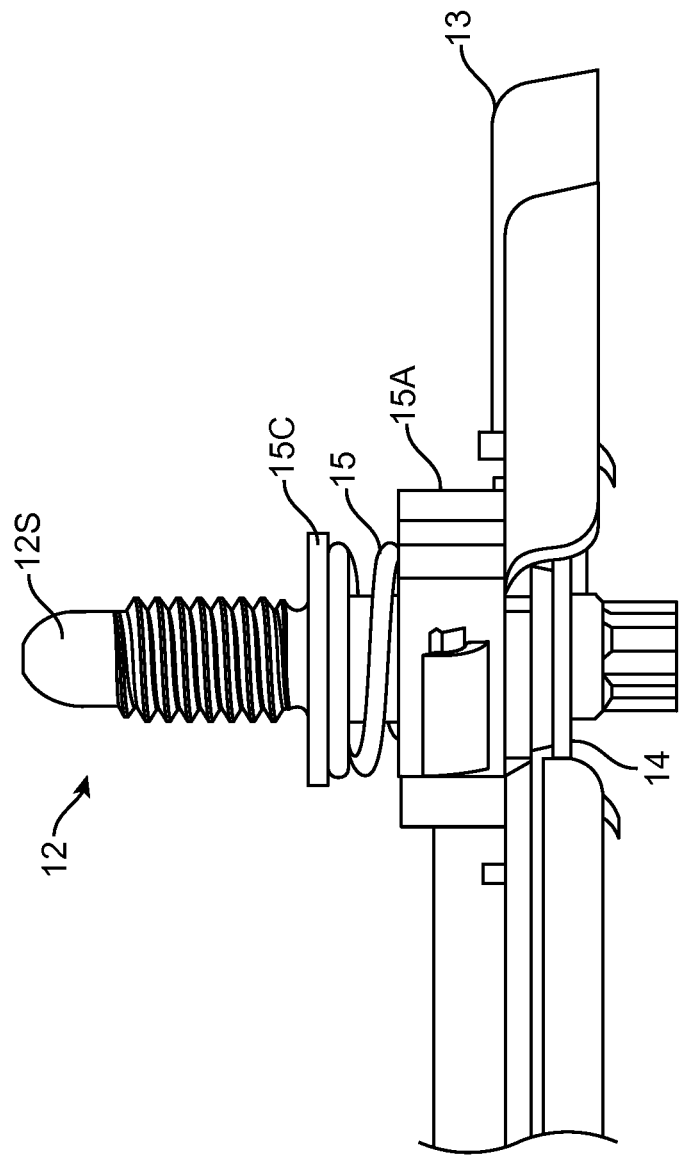
FIG. 7 illustrates an isolated side view of a support assembly coupled to an airbag frame plate according to one embodiment of the invention.

FIG. 2 illustrates a top perspective view of an airbag frame support device 11, according to one embodiment of the invention. In one embodiment of the invention, the airbag frame support device 11 includes a frame plate 13 and multiple airbag support assemblies 12, each support assembly including a spring member 15 (FIG. 7). The airbag frame support device 11 further includes an electrical assembly comprising switches 19 each having a switch assembly tab 19A, and electrical wires 31. As used herein, a spring member can comprise an elastic object (e.g., a compression spring, coiled spring, leaf spring), and may be made from materials that can store mechanical energy, as those skilled in the art will recognize.

In one embodiment, the tab 19A is situated a distance above the frame plate 13 to provide clearance allowing passage of electrical wires 31 underneath the tab 19A and to provide wire management. Each tab 19A maintains wires 31 passing thereunder, thereby protecting the electrical wire 31 from forces and vibrations from movement of a vehicle.

In one example, the switches 19 are push or pressure switches using a flexible member, such as a spring or equivalent compressible component. Each switch 19 may comprise a normally open, momentary switch. In one example, the airbag frame support device 11 includes multiple switches 19. Each switch 19 includes legs 19C (FIG. 13) that allow snapping the switch into corresponding holes in the plate 13.

Figure 3:
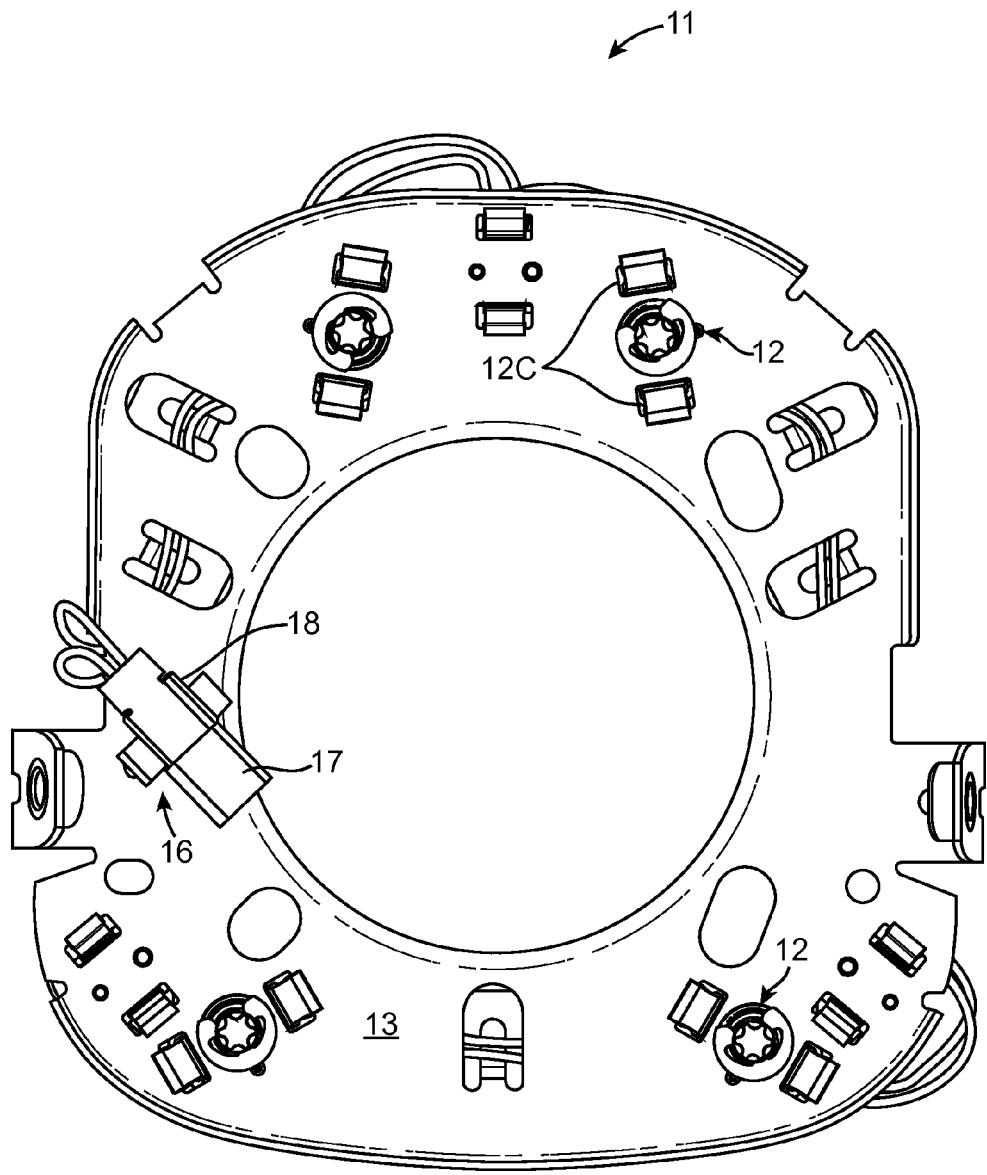
FIG. 3 illustrates a bottom view of the airbag frame device shown in FIG. 2.
Figure 4:
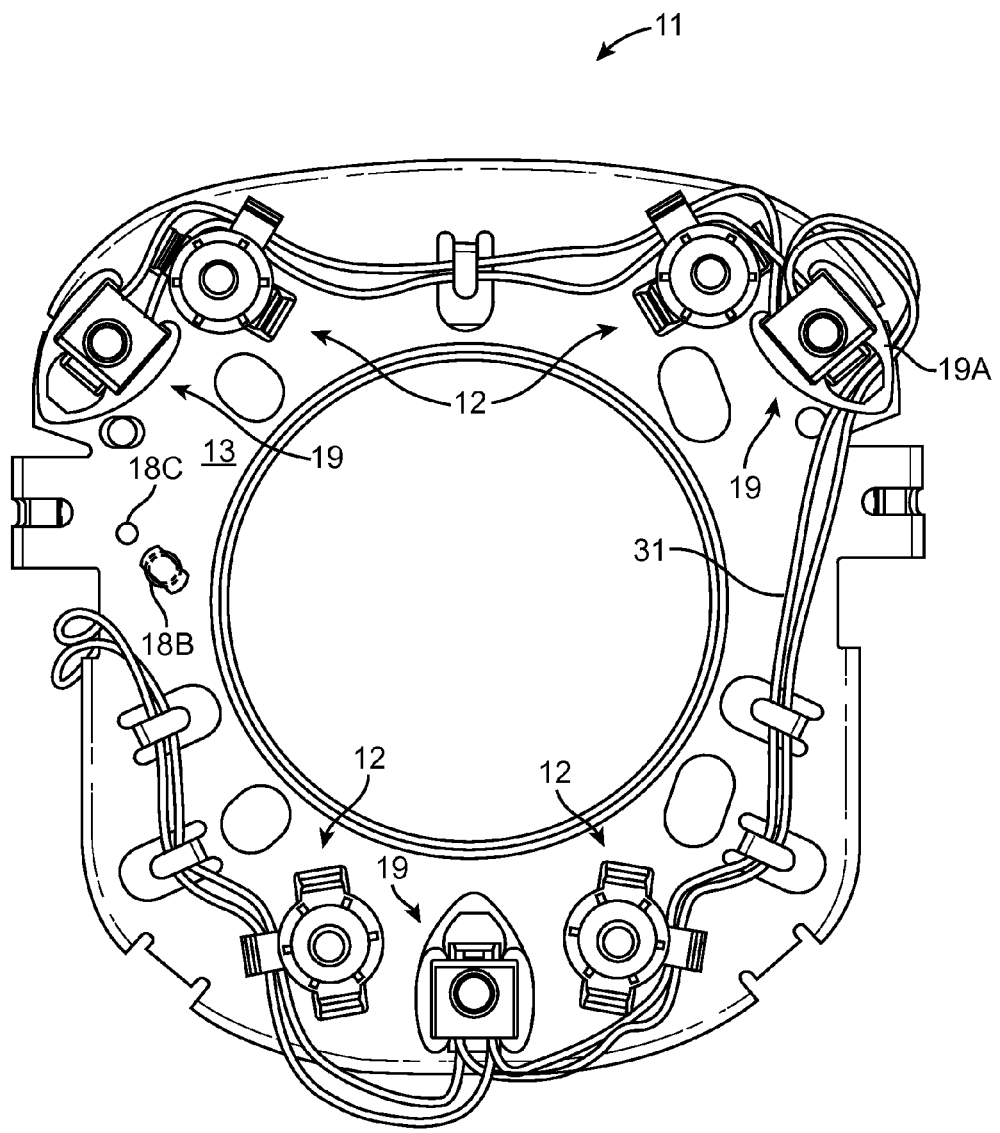
FIG. 4 illustrates a top view of the airbag frame device shown in FIG. 2.

FIG. 3 illustrates a bottom view of the airbag frame support device 11, and FIG. 4 illustrates a top view of the airbag frame support device 11. In one embodiment, the frame support device 11 further includes a wiring harness assembly 16. The wiring harness assembly 16 includes a wiring harness holder 18 and an electrical connector 17, wherein the electrical connector 17 is removably received and maintained by the wiring harness holder 18. In one embodiment, the electrical connector 17 of the wiring harness assembly 16 is configured for connecting to a corresponding electrical horn connector.

Figure 8:
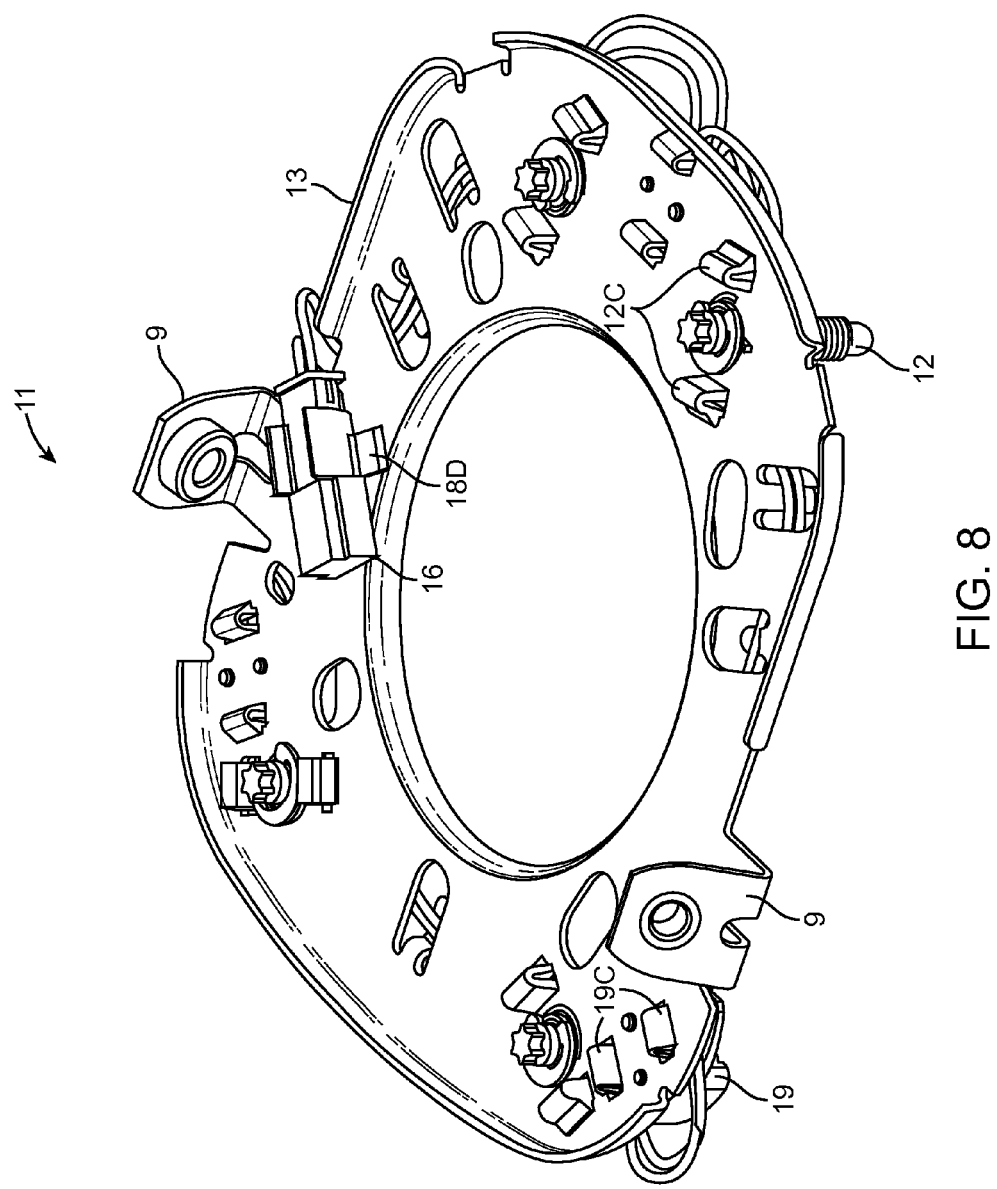
FIG. 8 illustrates a side perspective view of the airbag frame device shown in FIG. 2.

The wiring harness 16 is coupled to frame plate 13 via a wiring harness holder tab 18D (FIG. 8). The electrical wires 31, switches 19 and an electrical connector 17 (FIG. 9) are coupled to a wiring harness assembly 16. In one example the wiring harness holder 18 snaps into openings in the frame plate 13.

In one embodiment, the harness holder 18 includes an insertion tip 18B and a tab 18C. In one example, the insertion tip 18B and the tab 18C are inserted through corresponding apertures of the frame plate 13 to snap the harness holder 18 onto the frame plate 13. In one embodiment of the invention, the tab 18C prevents the harness holder 18 from rotating on the frame plate 13.

FIG. 8 illustrates a bottom perspective view of the airbag frame support device 11. As illustrated, wherein tabs 18D of the holder 18 rest on a bottom surface of the frame plate 13 for additional support and prevention of movement of the wiring harness assembly 16.

In one embodiment, the support assemblies 12 and the switches 19 and wiring harness assembly 16 are removably attached (snapped) on the frame plate 13 using corresponding openings/through-holes on the frame plate 13. The support assemblies and switches may be moved to other locations on the frame plate 13 where there are holes for snapping them onto the frame plate 13. Further, in one example, a support assembly 12 may be replaced as needed without replacing all of the support assemblies 12.

In one embodiment, the frame plate 13 can be made of a metal with a central aperture about 74 mm in radius. In other embodiment, the central aperture may have a range between about 65 mm to 85 mm.

In one embodiment, each support assembly 12 may include an airbag coupling member 12S (FIG. 7) such as a screw or bolt type element made of a metal, metal alloy, etc. In one example, each support assembly 12 may comprise zinc plated steel.

Figure 5:
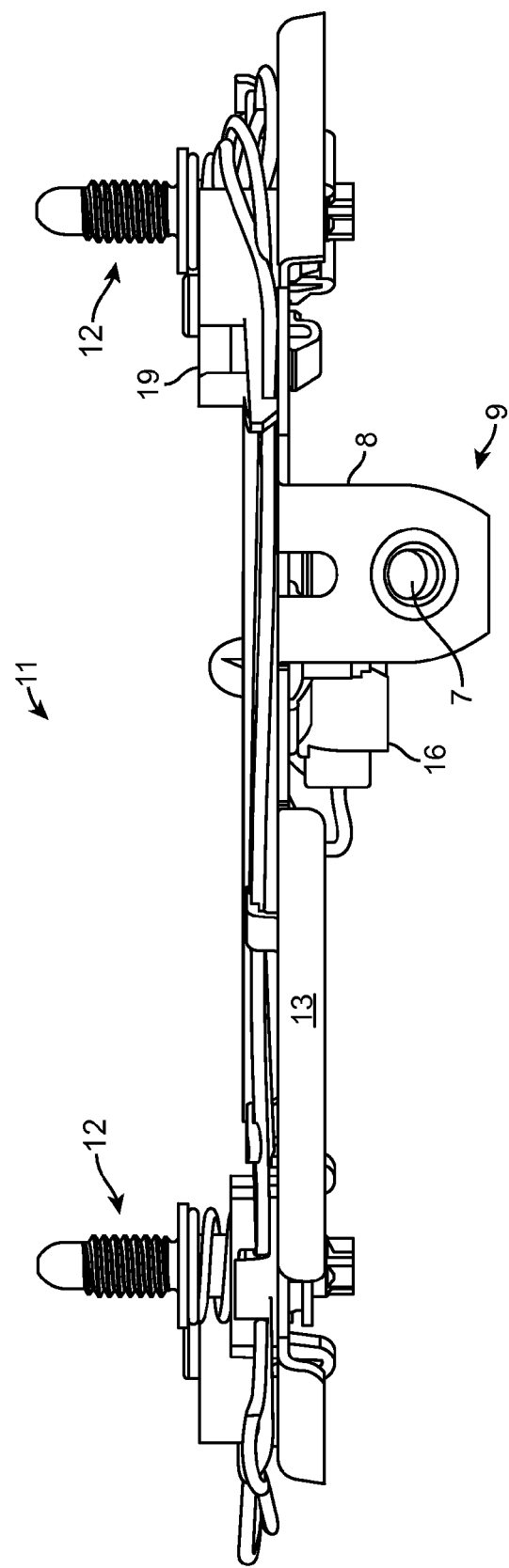
FIG. 5 illustrates a left side view of the airbag frame device shown in FIG. 2.
Figure 6:
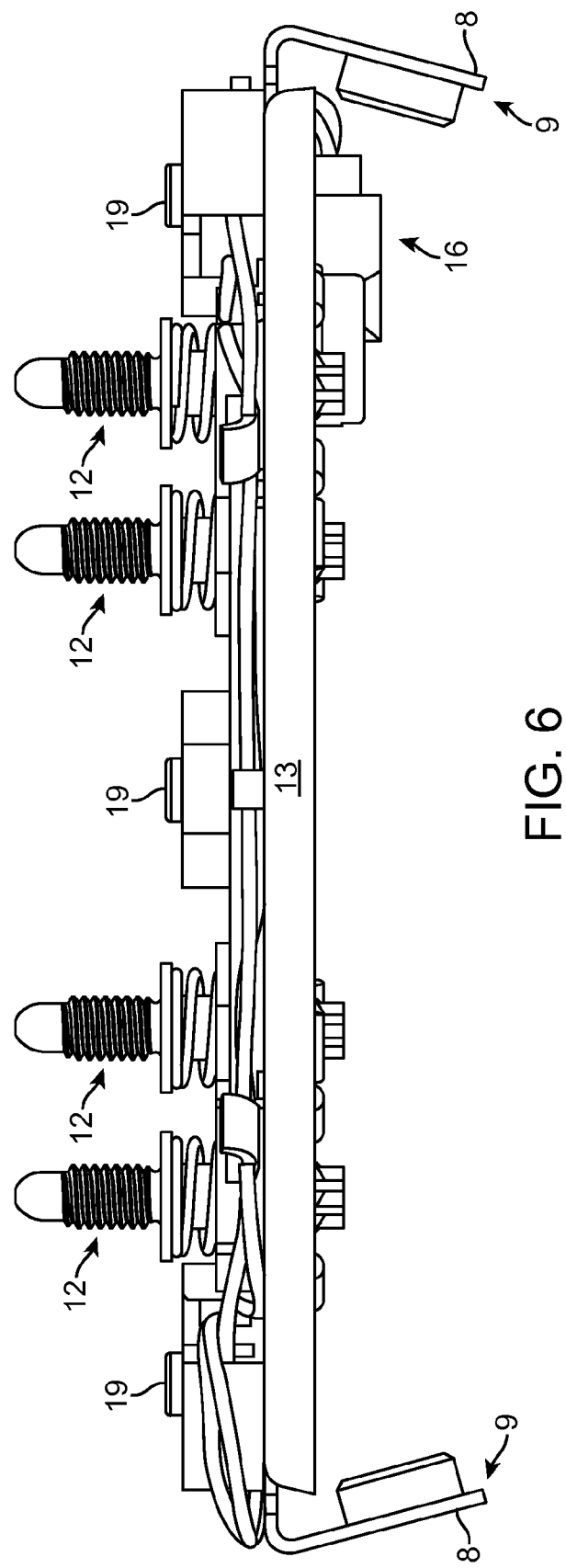
FIG. 6 illustrates a front view of the airbag frame device shown in FIG. 2.

FIG. 5 illustrates a left side view of the airbag frame support device 11. FIG. 6 illustrates a front view of the airbag frame support device 11. In one example, the support assemblies 12 are symmetrically positioned on the frame plate 13 to align with corresponding attachment portions of an airbag assembly 30 (FIG. 18). In another example, the support assemblies 12 may be asymmetrically positioned on the frame plate 13 as needed to align with corresponding attachment portions of an airbag assembly 30. In one example, the position, size and shape of the various openings and through-holes on the frame plate 13 may be adapted as desired based on, for example, attachment points to an airbag assembly, size of a steering wheel unit, thickness of the attached elements, etc.

FIG. 7 illustrates a side view of a support assembly 12 coupled to the frame plate 13, according to one embodiment of the invention. In one embodiment, each support assembly 12 further comprises a bracket 15A including an aperture that surrounds the coupling member 12S. Each bracket 15A includes legs 12C (FIG. 3) that snap into corresponding openings in the frame plate 13. Each bracket 15A is held in place on the plate 13 by snapping legs 12C of the bracket 15A in corresponding openings in the plate 13.

Each coupling member 12S includes a flange 15C at a distance below the tip of the coupling member 12S, wherein the compression member 15 is disposed between the flange 15C and a bottom wall 15B of the bracket 15A (FIG. 14), concentric with the coupling member 12S on the top surface of the plate 13. A lock type spring/clip 14 is snapped on a lower portion of the coupling member 12S under the bottom surface of the plate 13. Each coupling member 12S is held in place in an opening of the plate 13 wherein the compression member 15 is in compression between the flange 15C and the bottom wall 15B. In some embodiments a portion of the bottom wall 15B protrudes through the frame plate 13. In other embodiments, the bottom wall 15B is flush with the frame plate 13.

As such, the coupling member 12S of the support assembly 12 is held in place in the bracket (surround) 15A against the frame plate 13 with a compression member 15 (e.g., a spring), wherein the compression member 15 normally urges the clip 14 against the bottom side of the frame plate 13.

In one embodiment, the annular bracket 15A may comprise a plastic sleeve, a metal or metal alloy sleeve, etc. that is snapped to the frame plate 13 through an opening or through-hole. The frame plate 13 essentially "floats" on the support assemblies 12 between the snap or lock type spring/clips 14 and bottom walls 15B of the brackets 15A. The floating aspect is partly a matter of perception until the airbag frame device 11 is fully installed on a steering wheel, wherein the frame plate 13 is fixed to the steering wheel armature, and the support assemblies 12 and airbag assembly 30 (see FIG. 18) actually float.

In one example, the distance/clearance between the frame plate 13 and a flange 15C on the support assembly 12 is about 9.5 mm when the compression member 15 is uncompressed, and about 7.5 mm when the compression member 15 is fully compressed. Other examples may have other ranges of compression/expansion for the compression member 15, such as 7.5 mm-11.5 mm uncompressed, and 5 mm-9.5 mm compressed. In one example, a force of 3-4.5 lbs compresses the compression member 15 enough for the switch 19 to close. It should be noted that the combined compression members 15 accumulate the force necessary to sound a horn by a user when the external portion of an air bag assembly 30 is pressed by a user in the center. Therefore, the selection of the compression members 15 cannot be excessive which will cause a user to have to exert too much force to sound the horn. Therefore, some travel of the support assembly in the frame plate occurs when a vehicle is driven over a road that includes at least some bumps or unevenness. If the travel is reduced by increasing the strength of the compression members 15, use of a vehicle horn becomes a strain for users. Therefore, based on the necessity of maintaining ease of use for the horn, in one embodiment of the invention a damping element 23 (FIG. 22) is added to prevent/reduce buzz, squeak and rattle (BSR) caused by the t4ravel of the support assembly.

As illustrated in the bottom perspective view of the airbag frame support device 11 in FIG. 8, each tab 18D rests on a bottom surface of the frame plate 13 for additional support and prevention of movement of the wiring harness assembly 16.

Figure 9:
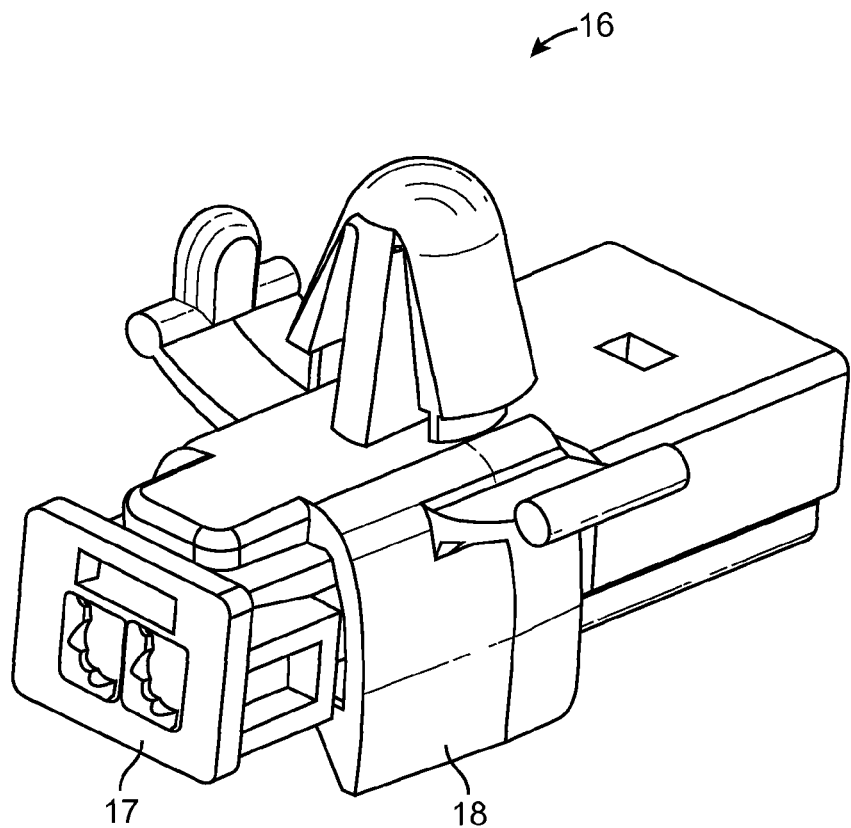
FIG. 9 illustrates an electrical connector shown connected with a harness holder according to one embodiment of the invention.

FIG. 9 illustrates a view of the wiring harness assembly 16 including the wiring harness holder 18 and the electrical connector 17 according to one embodiment of the invention. In one example, the wiring harness holder 18 is expandable so that the electrical connector 17 may be snapped into place within the wiring harness holder 18. In this example, the electrical connector 17 and wiring harness holder 18 comprise separate components. In another embodiment, the electrical connector 17 and wiring harness holder 18 are integrated into a single component.

Figure 10:
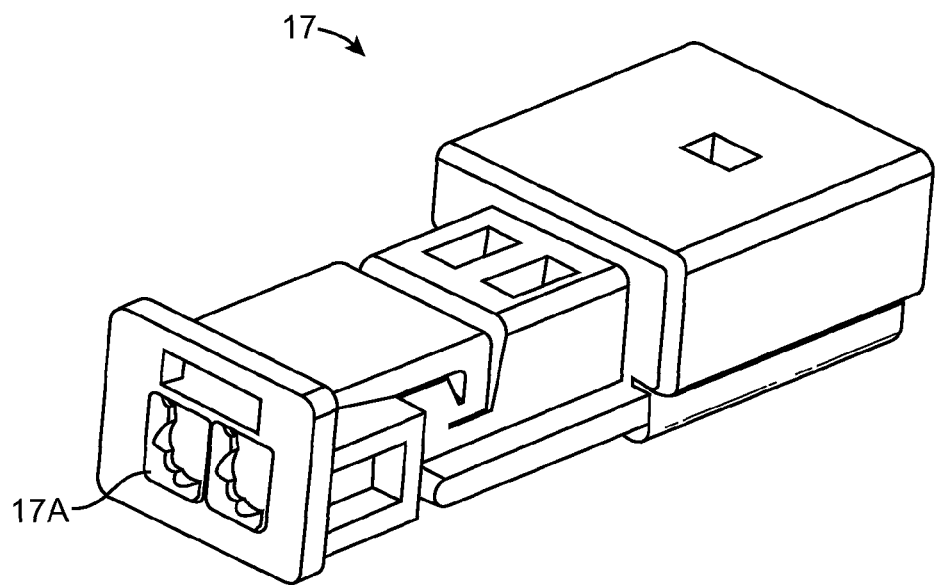
FIG. 10 illustrates an isolated view of an electrical connector according to one embodiment of the invention.

FIG. 10 illustrates an isolated view of the electrical connector 17 according to one embodiment of the invention. In one example, the electrical connector 17 includes inlet and outlet openings 17A for receiving electrical connections such as via wires. In one example, the electrical connector 17A includes metal pins attached to wires, which connect to the switches 19 in parallel. In another example, the electrical connector is attached to the frame plate 13 via a connector adapter.

Figure 11:
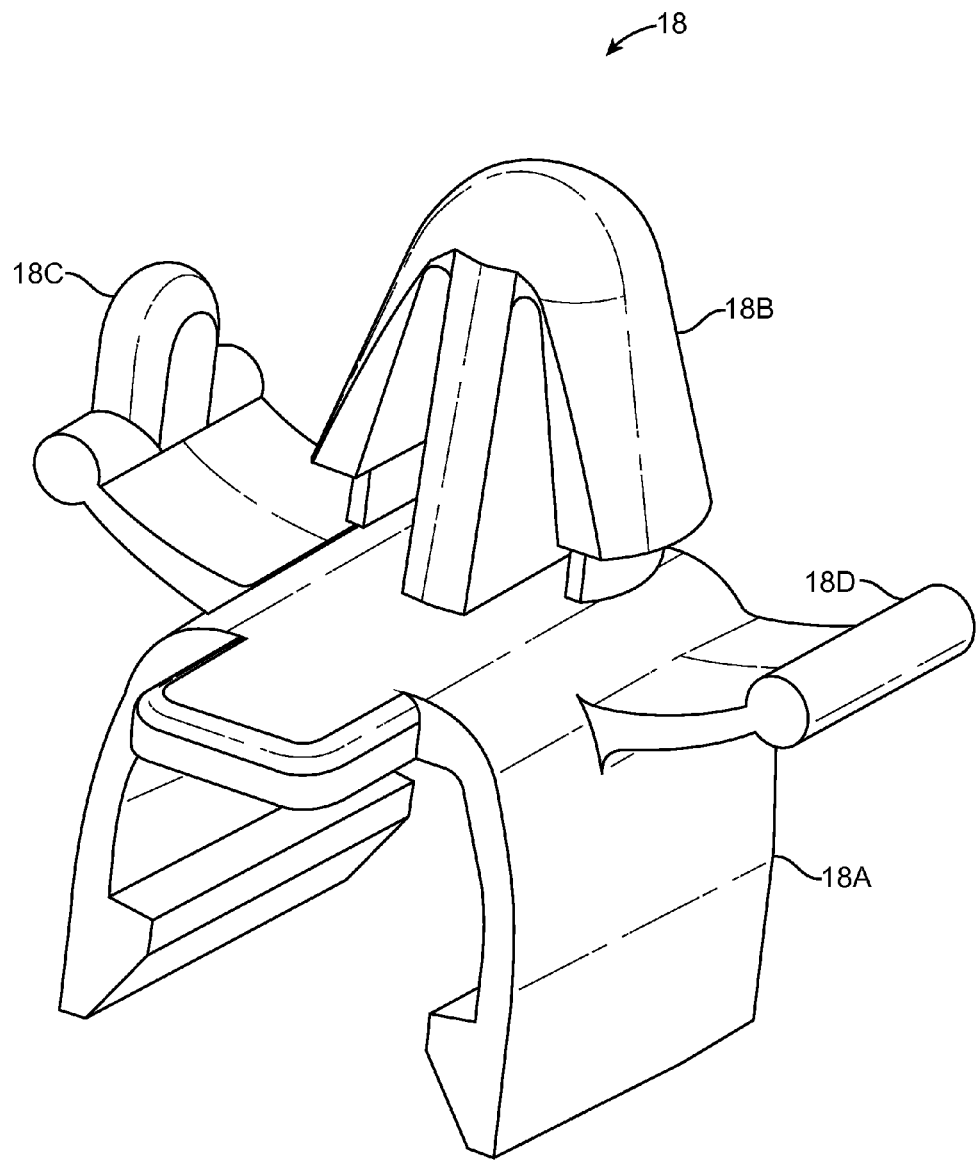
FIG. 11 illustrates an isolated view of a wiring harness holder for an electrical connector according to one embodiment of the invention.

FIG. 11 illustrates an isolated view of a wiring harness holder 18 for the electrical connector 17 according to one embodiment of the invention. In one example the legs 18A are used to snap the electrical connector 17 into the wiring harness holder 18 so that the electrical connector is held by compression force. The insertion tip 18B and tab 18C are sized for insertion through corresponding apertures of the frame plate 13. In this example, tab 18D rests on a bottom surface of the frame plate 13 for additional support and prevention of movement of the wiring harness assembly 16 for wire management.

Figure 12:
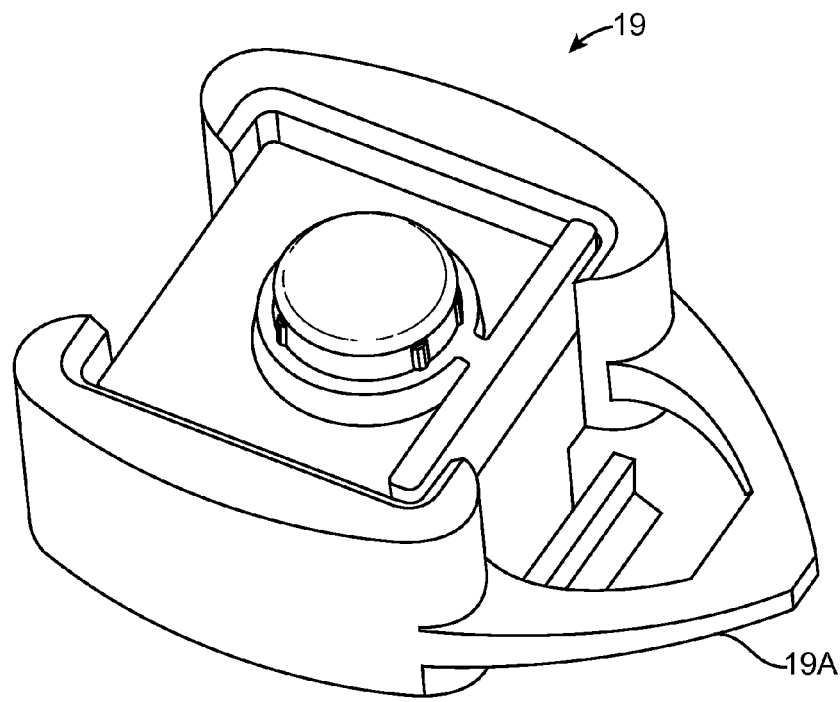
FIG. 12 illustrates a top perspective view of a switch according to one embodiment of the invention.

FIG. 12 illustrates a top perspective view of a switch 19 according to one embodiment of the invention. In one example, the switch 19 includes a switch body held by a switch attachment/cover element that includes switch assembly tab 19A. In another example the switch 19 is an integrated body that includes the switch and switch assembly tab 19A. It should be noted that a push switch can become damaged by excessive depression over time. In one example, the switch attachment/cover provides curved walls that provide a positive stop or limiter that prevents the switch button or plunger from being overly depressed from contact with the air bag assembly 30 (FIG. 18), which in turn provides a longer working product life expectancy for the switch 19 and limits damage to the inner workings of the switch (e.g., switch contact damage, spring damage, etc.). In one example, the body of switch 19 is made of plastic, metal, or similar strength material. In another example, the switch 19 may be other types of equivalent momentary switches.

Figure 13:
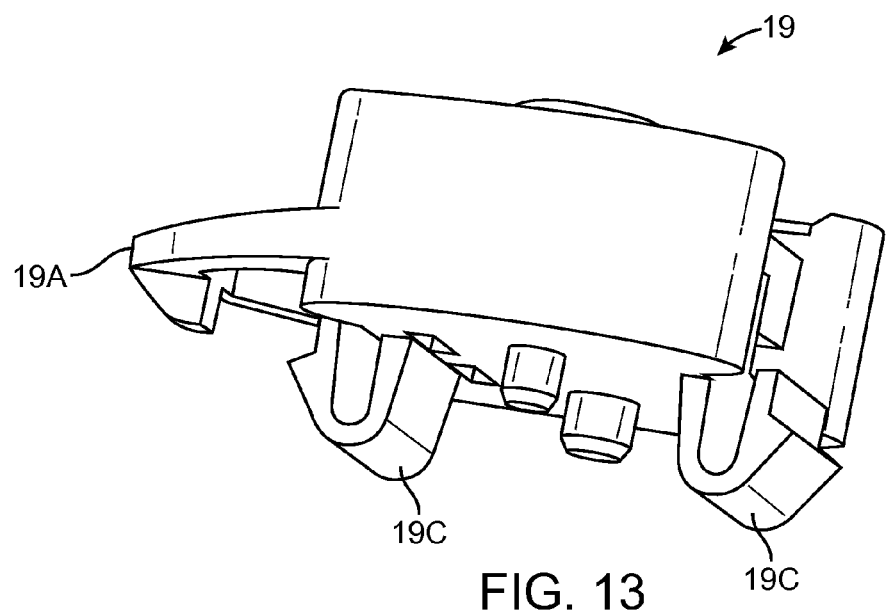
FIG. 13 illustrates a side perspective view of the switch shown in FIG. 12.

FIG. 13 illustrates a side perspective view of the switch 19. In one example, the switch assembly tab 19A includes a projection that may reside slightly above the frame plate 13 providing a bridge for the electrical wires 31 to pass underneath when the projection is forced to contact the frame plate 13 when the switch 19 is attached into openings in the frame plate 13, which also a provides wire management function.

Figure 14:
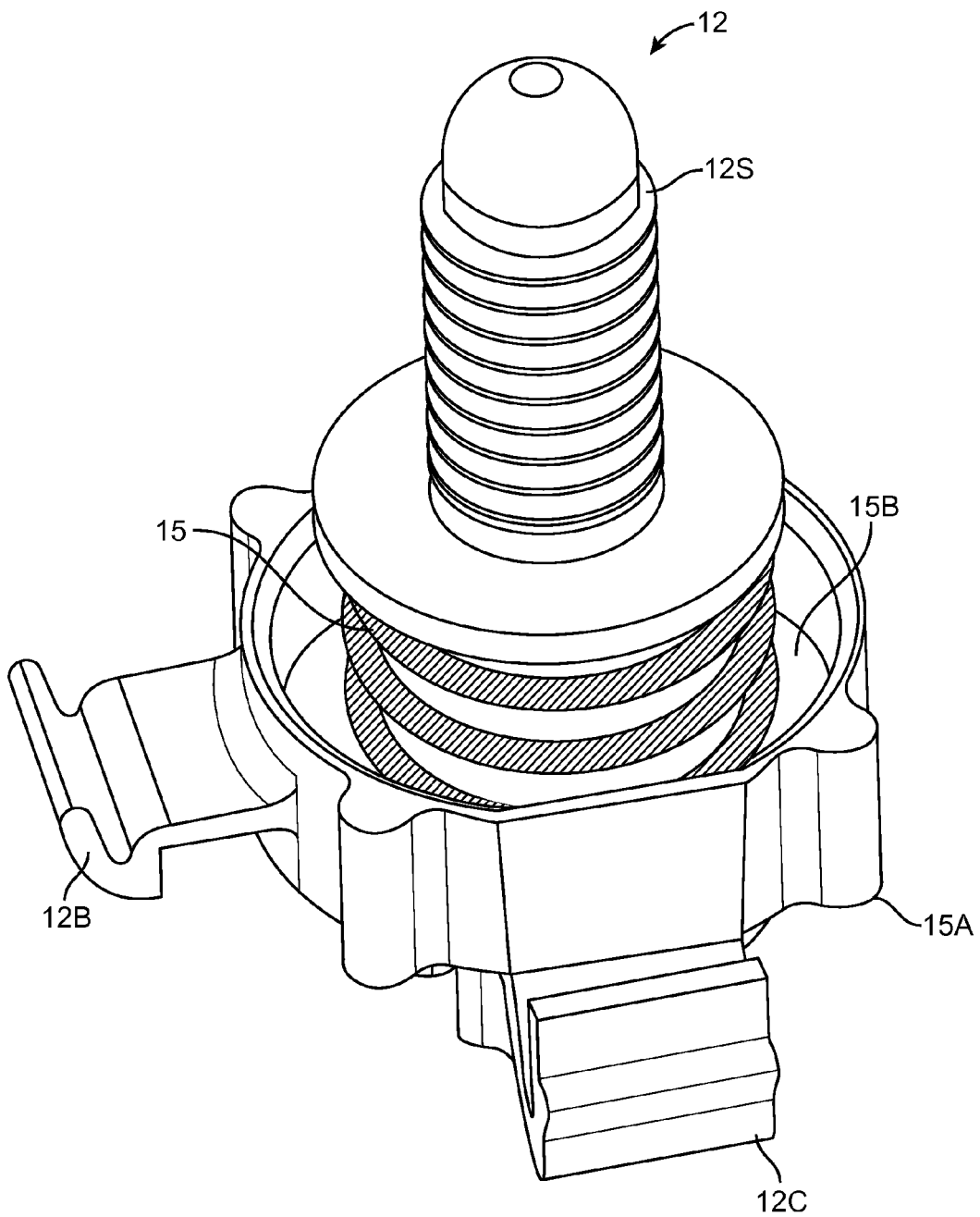
FIG. 14 illustrates a top perspective view of a support assembly coupled with a frame attachment portion for an airbag frame apparatus according to one embodiment of the invention.

FIG. 14 illustrates a top perspective view of a support assembly 12 coupled with a frame attachment portion 15A according to one embodiment of the invention. As noted, the bracket 15A has a bottom wall 15B pinched between the frame plate 13 and the compression member 15. In this example, the arrangement allows proper functioning of the airbag frame device 11 in normal (i.e., airbag in a ready and un-deployed), as well as in airbag deployment modes. In this example, the airbag frame device 11 is robust, and simple to install.

Figure 15A:
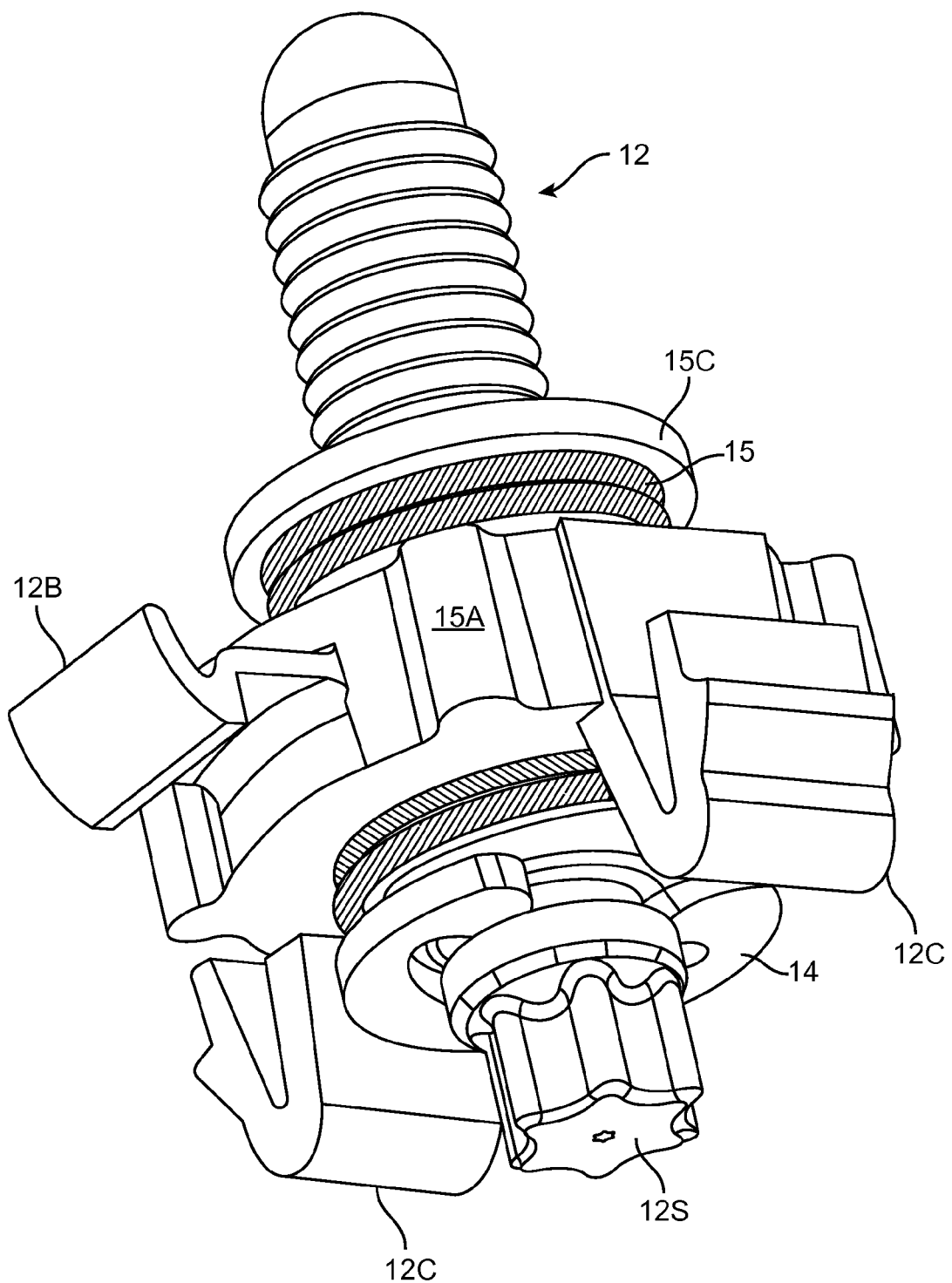
FIG. 15A illustrates a side perspective view of a support assembly coupled with a frame coupler for an airbag frame apparatus according to one embodiment of the invention.

FIG. 15A illustrates a side perspective view of the support assembly 12 coupled with the holder 15A according to one embodiment of the invention. In one example, tab 12B extends from the holder 15A and functions as a bridge to hold the electrical wires 31 underneath against the top face of the plate 13 (FIG. 2). The legs 12C snap into correspondingly sized openings in the frame plate 13.

Figure 15B:
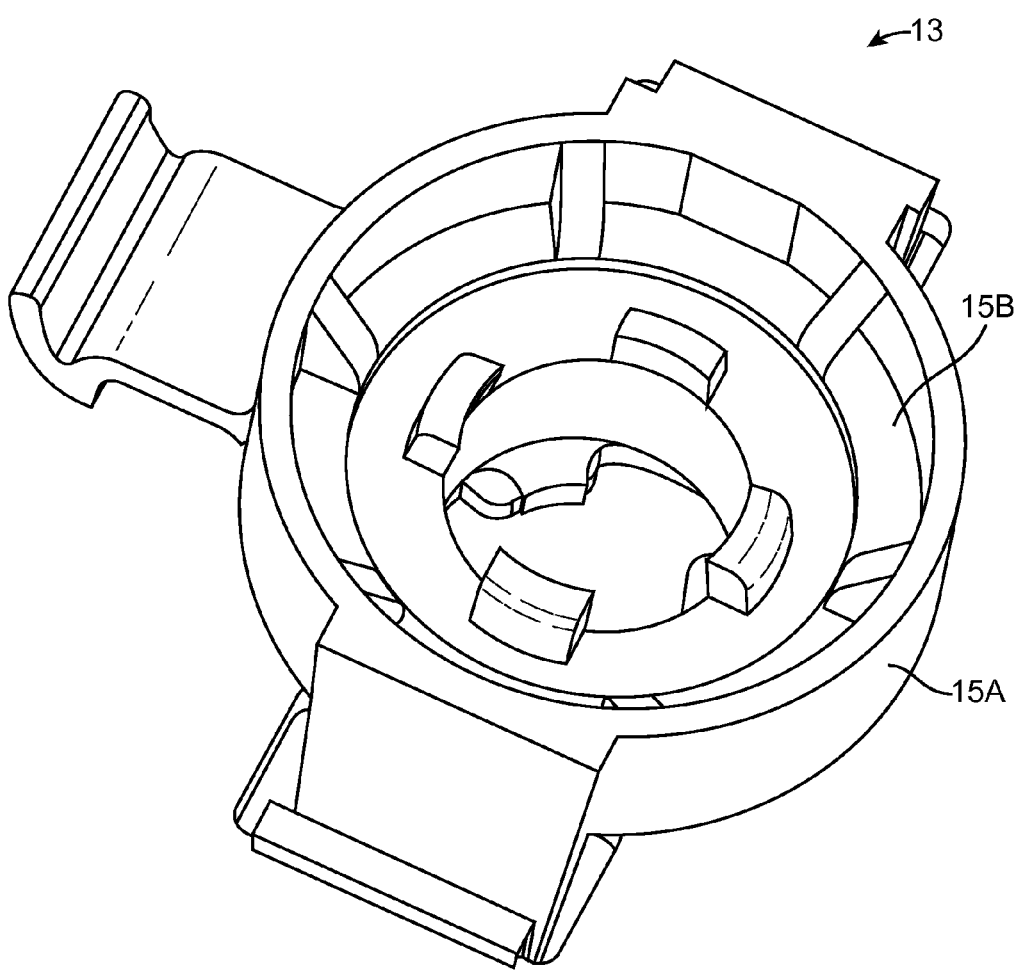
FIG. 15B illustrates a side perspective isolated view of a frame coupler for a support assembly of an airbag frame apparatus according to one embodiment of the invention.

FIG. 15B illustrates a top isolated perspective view of the holder 15A according to one embodiment of the invention. As illustrated, the holder 15A includes an opening slot for the support assembly 12.

Figure 16:
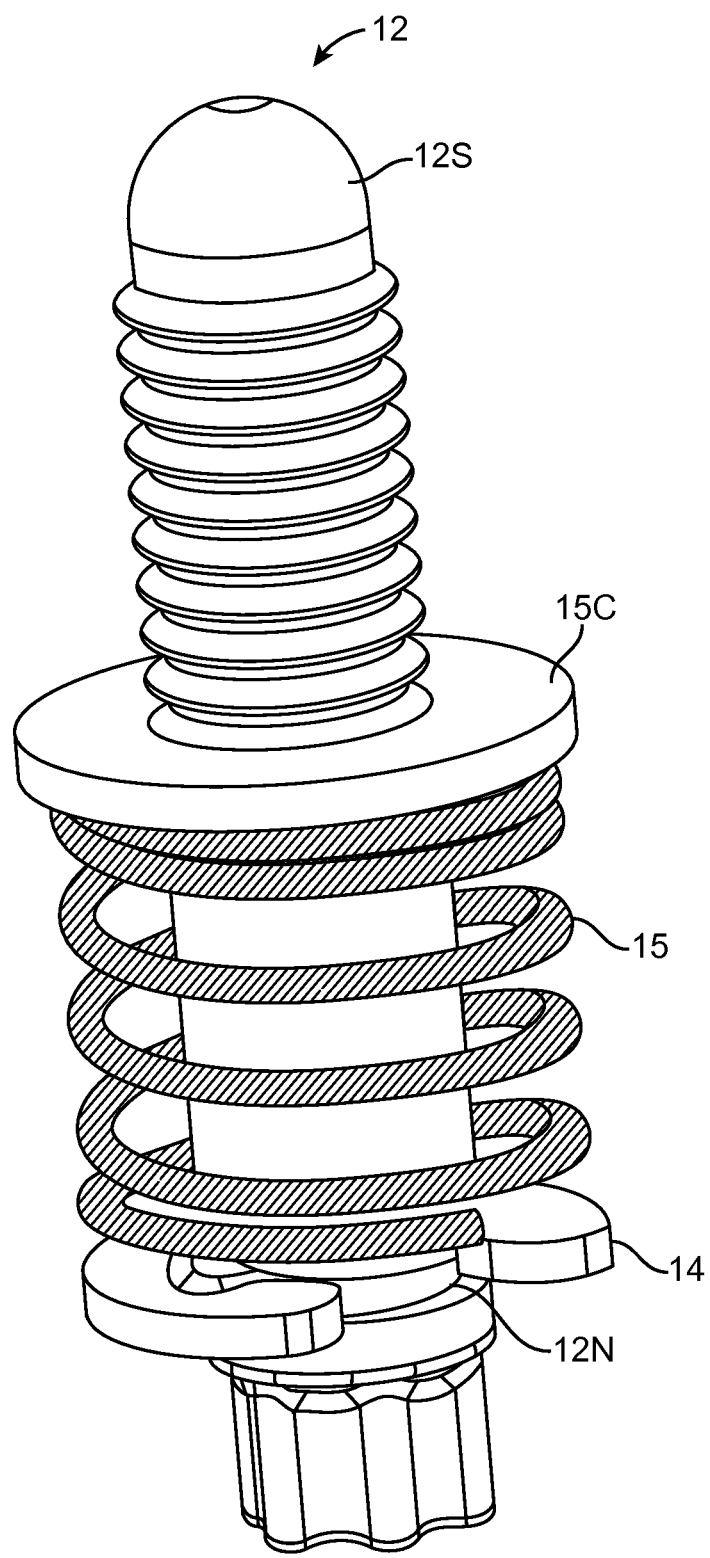
FIG. 16 illustrates a perspective view of an isolated support assembly for an airbag frame apparatus according to one embodiment of the invention.

FIG. 16 illustrates a perspective view of an isolated support assembly 12 according to one embodiment of the invention. In this example, the distance between a snap or lock type spring/clip 14 and the flange 15C on the coupling member 12S is about 10.7 mm when the compression member 15 is not compressed, and about 8.7 mm when the compression member 15 is fully compressed. Each type spring/clip 14 is snapped into a notch 12N on the airbag coupling member 12S. It should be noted that the internal gaps between the components, such as the support assembly 12, the frame plate 13, the compression member 15, flange 15C and the switch 19 control the size of external gaps of a steering wheel and external air bag and horn covering elements. Therefore, in one embodiment of the invention the gaps are limited by controlling the distance needed to move the support assembly to contact the switch 19 for causing the horn to function. Additionally, in cases where the frame plate may become bent (e.g., from excessive force), it is important for the gap dimensions to be maintained to prevent the horn from being sounded due forces from normal driving conditions (e.g., traveling over a bumpy road, potholes, etc.).

Figure 17A:
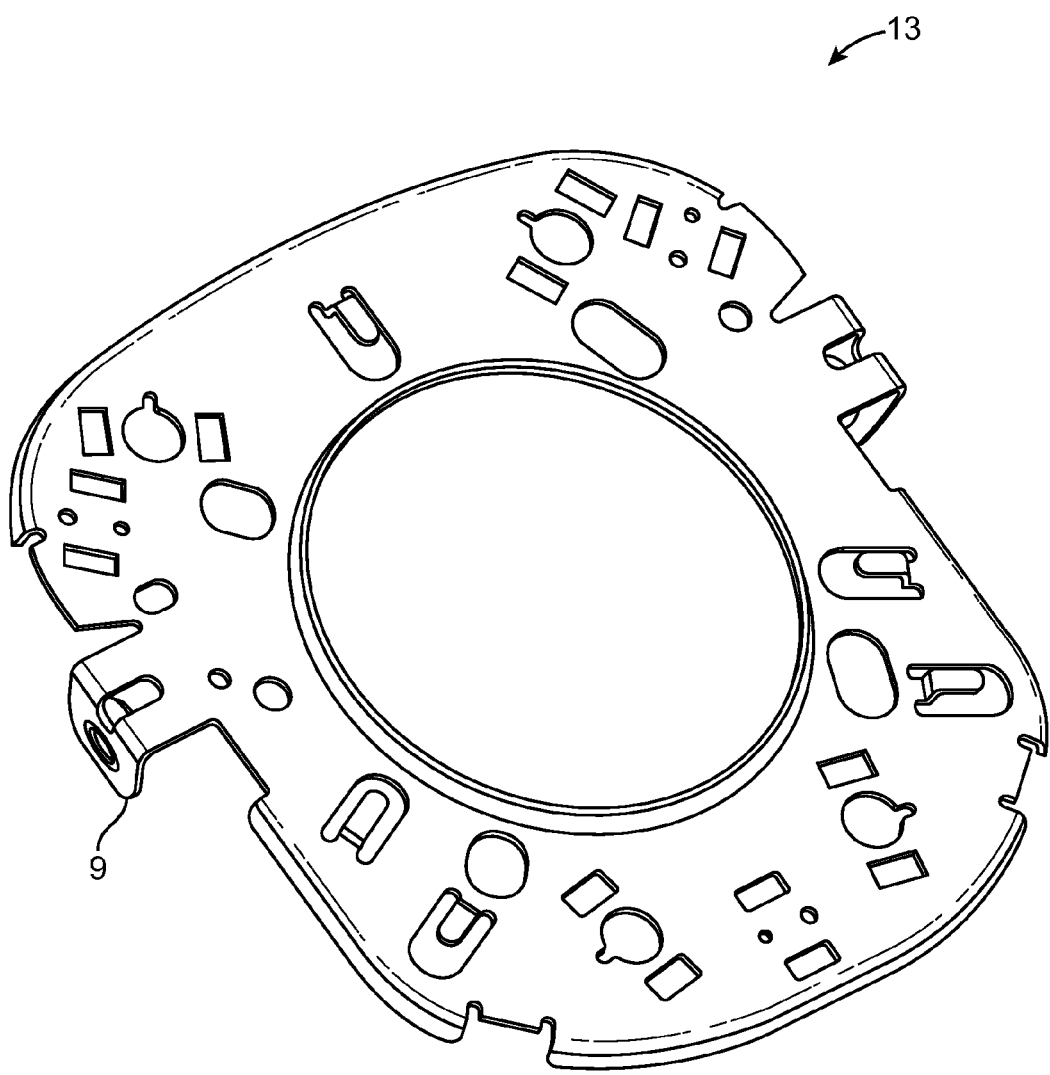
FIG. 17A illustrates a top perspective view of an isolated airbag support frame according to one embodiment of the invention.

FIG. 17A illustrates a top perspective view of an isolated frame plate 13 according to one embodiment of the invention. In one example, the frame plate 13 includes a variety of openings and through-holes of various shapes and sizes for fitment of corresponding elements of the airbag frame device 11.

Figure 17B:
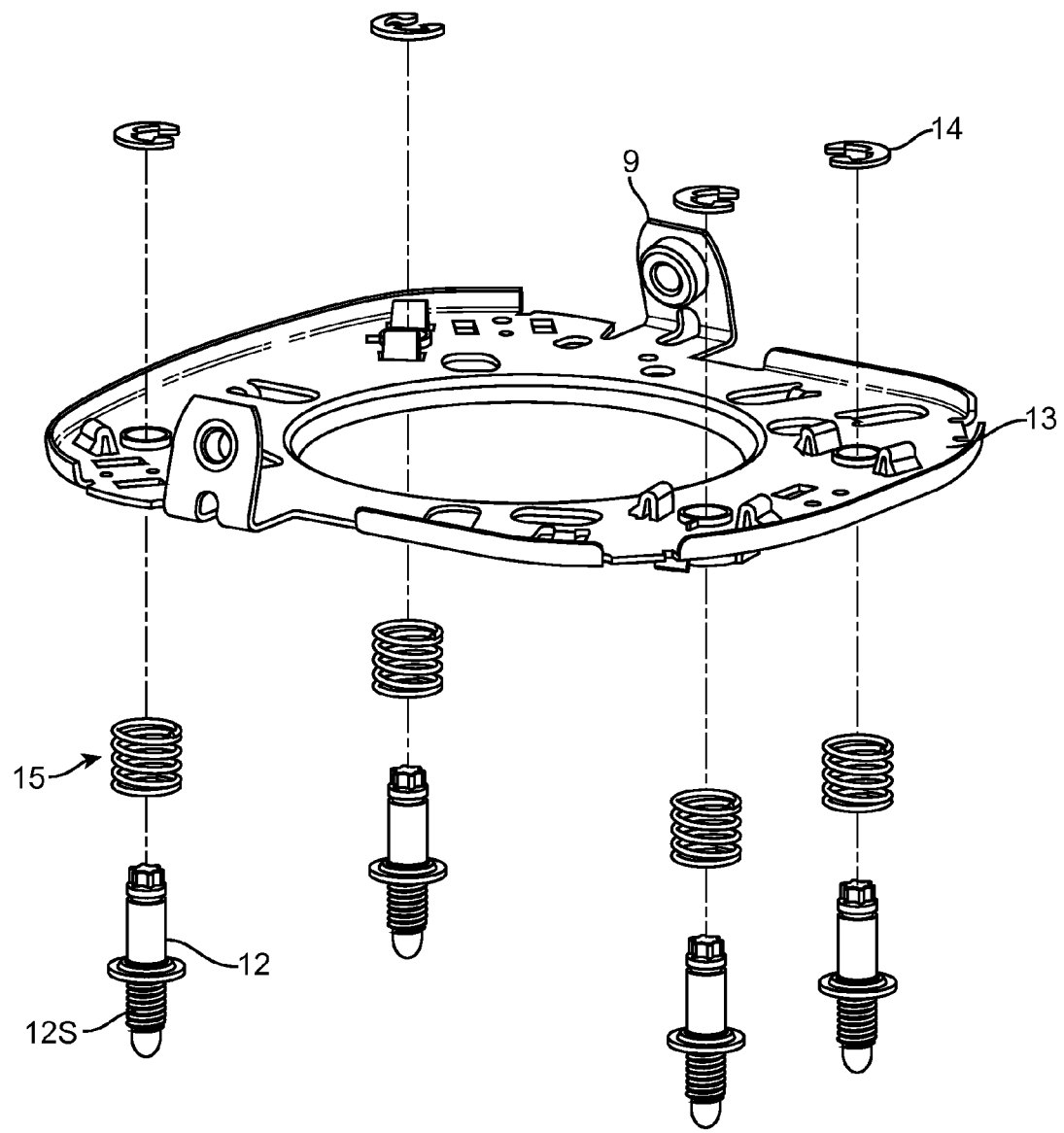
FIG. 17B illustrates an exploded view of an airbag support frame and support assemblies according to one embodiment of the invention.

FIG. 17B illustrates a bottom view of the frame plate 13 and exploded view of the support assemblies 12 according to one embodiment of the invention. As illustrated, the support assemblies 12 fit within the springs 15 and are placed through openings of the frame plate 13. In one example, the support assemblies are locked/fastened in place with the clip 14.

Referring back to FIGS. 5 and 6, the plate 13 includes a pair of steering wheel housing connectors 9 at its peripheries. Each connector 9 includes an extension 8 and an opening 7. The opening 7 allows attaching the plate 13 to a steering wheel housing via fasteners (e.g., bolts/nuts, sockets, pins, etc.). In one embodiment, each extension 8 is angled form the frame plate between about 70°-80°. In another embodiment, each opening 7 comprises a slot that ranges from about 2.2 mm-9.0 mm in length for fitment in a steering wheel housing. In one embodiment, each extension 8 includes score tabs for bending the extension 8 to provide adaptability in fitment within a steering housing.

FIG. 18 illustrates a front perspective view of the airbag frame device 11 coupled with an airbag assembly 30, wherein the plate 13 is and mounted on a steering wheel housing 10 according to one embodiment of the invention. The airbag assembly 30 is fixedly attached to the coupling members 12S. When compressed, the airbag assembly 30 can move towards and away from the frame plate 13, riding the coupling members 12S through the annular holders 15A into and out of the frame plate 13. The coupling members 12S move/slide axially along the center of the holder 15A essentially perpendicular/transverse to the surface of the planar frame plate 13. FIG. 18 shows the airbag assembly 30 while not under a compressive force, such the underside of the airbag frame 30 is not in contact with the switches 19.

Figure 19:
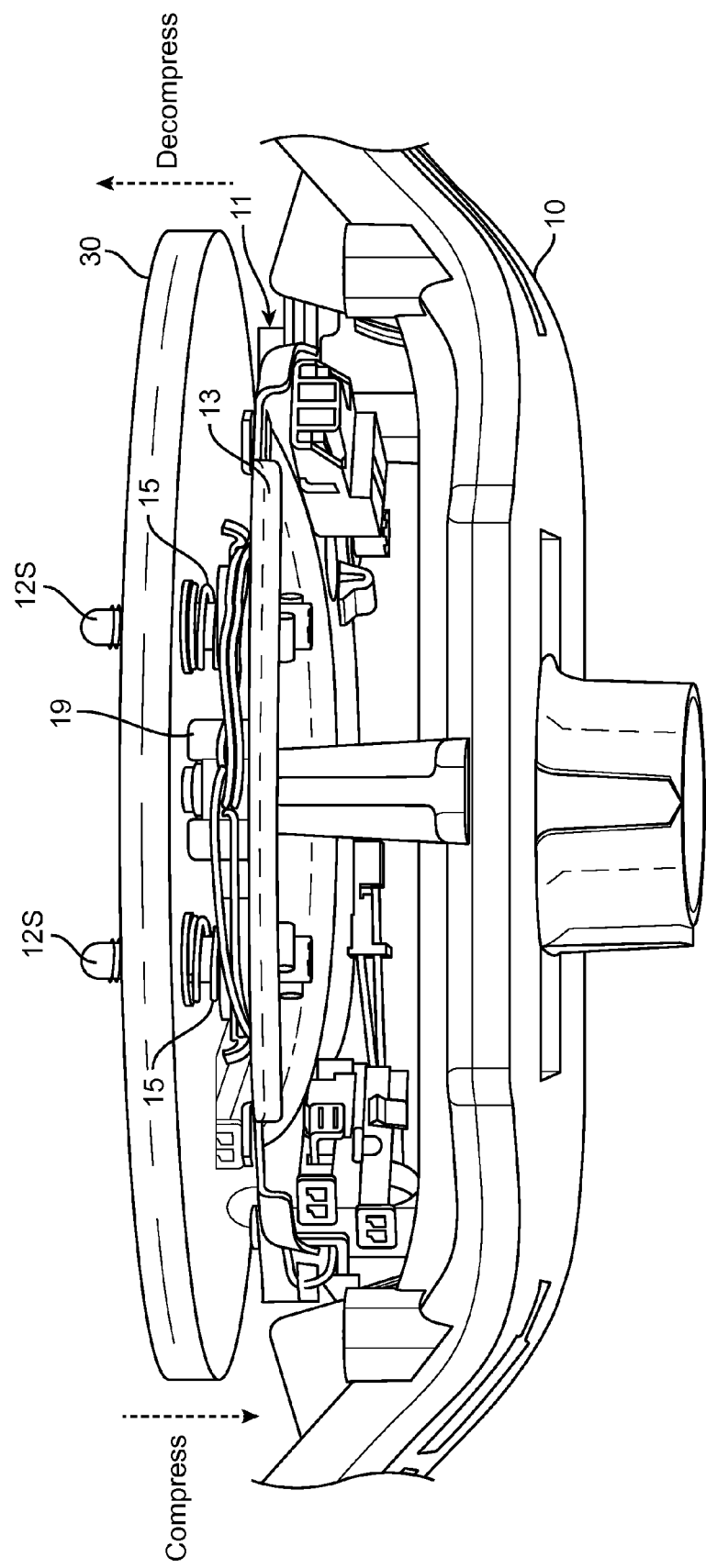
FIG. 19 illustrates a side perspective view of an airbag frame device coupled with an airbag assembly and steering wheel column/housing according to one embodiment of the invention.

FIG. 19 illustrates a side perspective view of an airbag frame device 11 coupled with an airbag assembly 30 of FIG. 18, wherein the frame plate 13 is mounted on the steering wheel housing 10 according to one embodiment of the invention. As in FIG. 18, the airbag assembly 30 is fixedly attached to the coupling members 12S.

FIG. 19 shows the airbag assembly 30 pressed down (compressed) towards the airbag frame device 11, wherein the compression members 15 are further compressed, allowing the coupling members 12S to slide down into respective openings in the frame plate 13. This allows the underside of the airbag assembly 30 to move towards the frame plate 13 and come into contact with the switches 19, closing an electrical circuit via the electrical wires 31 and wiring harness assembly 16 that may operate, for example, an electrical horn device for the vehicle. FIG. 19 shows the underside of the airbag assembly 30 pushed against one or more switched 19 by a compressive force, wherein said one or more switches closes one or more corresponding electrical circuits.

When pressure is removed from the airbag assembly 30, the springs 15 decompress and urge the airbag assembly 30 away from the frame plate 13, opening the switches 19, as in FIG. 18. As such, the airbag assembly 30 can move towards and away from the frame plate 13 along the dashed arrows shown in FIG. 19, riding the coupling members 12S into and out of the frame plate 13. The frame plate 13 remains in fixed relationship with the steering housing 10, while the airbag assembly 30 fixed to the coupling members 12S moves transversely in relation to the frame 13 as one or more springs 15 are compressed and decompressed and one or more coupling members 12S transversely slide into and out of the frame plate 13 (i.e., through annular openings in the corresponding brackets 15A and the frame 13).

FIG. 20 illustrates an isolated view of an electrical switch assembly for the airbag frame device 11 according to one embodiment of the invention. In one example, the switches 19 are attached to the electrical wires 31 and the electrical connector 17 via known methods, such as crimping, soldering, pressure attachment, etc. In one example, a two wire system is used where the switches 19 maintain the separation of the two wires when in the open state and connect the two wires in the closed state to complete the electrical circuit.

FIG. 21 illustrates an isolated side view of the electrical switch assembly of FIG. 20 showing an exploded view of switches 19 according to one embodiment of the invention. In one example, the switches 19 include a compression member, such as a spring that is used to return the switch to the open state when pressure is removed from the switch 19 (e.g., when pressure is removed from the airbag assembly 30). In one example, the switches 19 are formed by a switch housing/cover and an attachment portion, which may be separate components or integrated as a single component.

Figure 22:
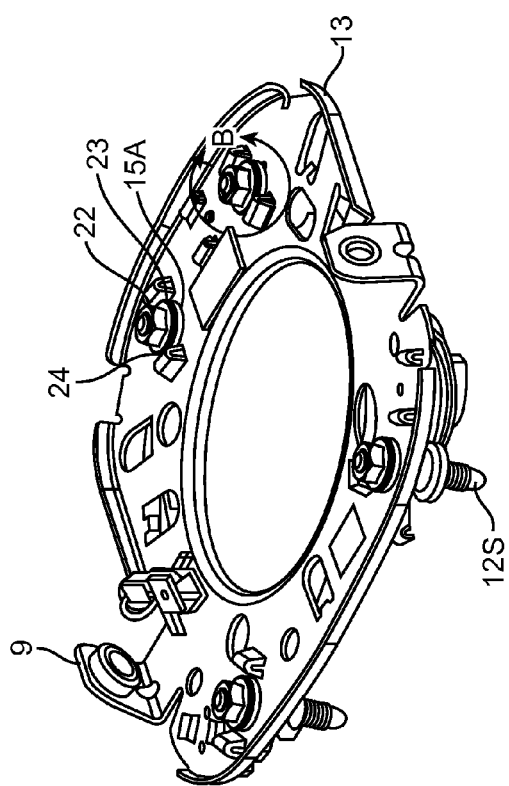
FIG. 22 illustrates a bottom perspective view of an airbag frame device showing a locking/fastening portion of a support assembly for an airbag frame plate according to another embodiment of the invention.

FIG. 22 illustrates a bottom perspective view of an airbag frame device 11 showing a locking/fastening portion 22 of a support assembly 12 according to another embodiment of the invention. In one embodiment, the locking/fastening portion 22 is a bolt/nut device that engages a threaded bolt 12S. In this embodiment, the clip 14 and notch 12N on the member 12S are not required (FIG. 16).

In one example, the locking/fastening portion 22 (FIG. 22) is made of a metal, metal alloy, hardened plastic, etc. On another example, the locking/fastening portion 22 is coupled with a washer 24 and a dampening element 23. In one embodiment, the washer 24 is a separate component and comprises a metal washer. In another embodiment, the washer 24 is integrated with the locking/fastening portion 22 (e.g., a flanged nut device).

In one embodiment, each dampening element 23 may comprise one or more compressible components, such as a rubber or similar material washers, disposed concentric with each coupling member 12S between a corresponding washer 24 and the frame plate 13. Each dampening element 23 prevents contact between the washer 23 and the frame plate 13. The dampening element 23 reduces/eliminates noise, vibrations, hum, rattles, etc. (e.g., BSR) that may otherwise be caused by impact between the washer 24 and the frame plate 13 (or bracket 15A and clip 14; or bracket 15A and washer 24) due to vibration of the steering column of a moving vehicle in which an airbag frame support device 11 (and airbag assembly 30) is mounted or movement of the components within the frame plate 13, according to embodiments of the invention. In other embodiments, equivalent dampening elements may include: rubber or similar material disposed on the frame plate 13 between the washer 24 and the frame plate 13, dampening coatings (e.g., flowed over the locking/fastening portion 22, etc. It should be noted that the washer 23 may be the same size, larger or smaller in diameter than the washer 24 and the locking/fastening portion 22.

Figure 23:
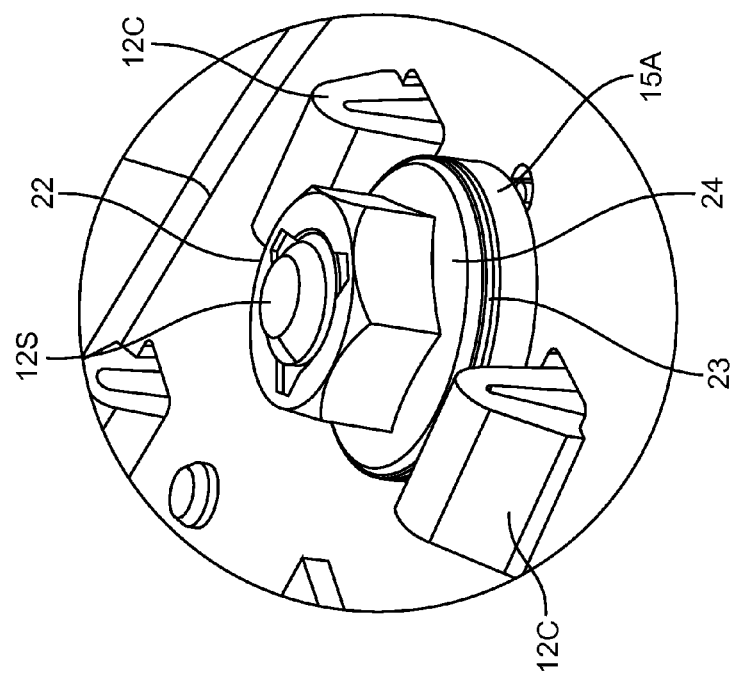
FIG. 23 illustrates an isolated view of a locking/fastening portion of a support assembly for an airbag frame device according to one embodiment of the invention.

FIG. 23 illustrates an isolated view of a locking/fastening portion 22 of a support assembly 12 for an airbag frame device 11 according to one embodiment of the invention. The dampening element 23 may also be utilized with the embodiment of device 11 shown in FIG. 8 wherein the dampening washer 23 may be disposed concentric with element 12S between the clip 14 and the frame plate 13.

In the description above, numerous specific details are set forth. However, it is understood that embodiments of the invention may be practiced without these specific details. For example, well-known equivalent components and elements may be substituted in place of those described herein, and similarly, well-known equivalent techniques may be substituted in place of the particular techniques disclosed. In other instances, well-known structures and techniques have not been shown in detail to avoid obscuring the understanding of this description.

Reference in the specification to "an embodiment," "one embodiment," "some embodiments," or "other embodiments" means that a particular feature, structure, or characteristic described in connection with the embodiments is included in at least some embodiments, but not necessarily all embodiments. The various appearances of "an embodiment," "one embodiment," or "some embodiments" are not necessarily all referring to the same embodiments. If the specification states a component, feature, structure, or characteristic "may", "might", or "could" be included, that particular component, feature, structure, or characteristic is not required to be included. If the specification or claim refers to "a" or "an" element, that does not mean there is only one of the element. If the specification or claims refer to "an additional" element, that does not preclude there being more than one of the additional element.

While certain exemplary embodiments have been described and shown in the accompanying drawings, it is to be understood that such embodiments are merely illustrative of and not restrictive on the broad invention, and that this invention not be limited to the specific constructions and arrangements shown and described, since various other modifications may occur to those ordinarily skilled in the art.

What is claimed is:

1. An apparatus for supporting a vehicle airbag device, comprising:
a frame having a plurality of openings for slidably receiving a plurality of airbag support assemblies, wherein each support assembly comprises:
an airbag coupling member slidably disposed in a corresponding one of said openings in the frame for maintaining a spring member between the frame and the airbag device, the airbag coupling member having a coupling end protruding from a first side of the frame facing the airbag device for coupling to the airbag device, wherein pressing the airbag device towards the frame compresses the spring member therebetween;
the airbag coupling member having a locking member at a locking end of the airbag coupling member protruding from a second side of the frame opposing said first side, for slidably maintaining the frame on the airbag coupling member between the locking member and the airbag device;
a bracket disposed at said corresponding opening on the frame for receiving the airbag coupling member such that the airbag coupling member is movable relative to the bracket;
a vibration reduction member between the frame and the locking member; and
an electrical switch assembly coupled to the frame, wherein the electrical switch assembly comprises at least one push button electrical switch for coupling to an electrical circuit.

2. The apparatus of claim 1, wherein:
the frame includes an essentially planar portion having said openings, each opening for slidably receiving a portion of an airbag coupling member of a corresponding support assembly, transverse to said planar portion of the frame, such that pressing the airbag device towards the frame compresses the spring member and causes at least a portion of said airbag coupling member to slide into the opening for lowering a portion of the airbag device towards the frame; and
the frame comprises a steering wheel coupling portion configured for coupling the frame to a steering wheel.

3. The apparatus of claim 2, wherein each bracket includes an opening for receiving a corresponding coupling member, and an attachment portion for coupling with the frame.

4. The apparatus of claim 3, wherein:
for each locking member, said locking end protruding from the second side of the frame is distal from said coupling end of the airbag coupling member;

the spring member of each support assembly is disposed concentric with said portion of the airbag coupling member protruding from said first side of the frame facing the airbag device, to normally urge the locking member against said second side of the frame as the spring member urges the airbag device away from said first side of the frame, wherein pressing the airbag device towards the frame with sufficient force compresses the spring member to lower the airbag device towards the frame.

5. The apparatus of claim 4, wherein the spring member of each support assembly is disposed in said bracket concentric with said portion of the airbag coupling member protruding from said first side of the frame facing the airbag device.

6. The apparatus of claim 4, wherein each bracket further comprises a wire management mechanism comprising a tab for maintaining wiring for the switching assembly against the frame.

7. The apparatus of claim 4, wherein each switch further comprises a wire management mechanism comprising a tab for maintaining wiring for the switching assembly against the frame.

8. The apparatus of claim 4, further comprising a connecter configured for coupling to an electrical circuit for powering a horn, such that pressing the airbag device coupled to a coupling end of each airbag coupling member a predetermined distance slidably lowers a portion of at least one airbag coupling member into a corresponding opening in the frame for urging the coupled airbag device against at least one switch in the electrical switch assembly to close the horn circuit and sound the horn, and wherein ceasing said pressure allows the spring member to expand and urge the airbag device away from the switch to open the switch of the horn circuit to cease sounding the horn.

9. The apparatus of claim 4, wherein:
in each support assembly, the vibration reduction member is coupled between the second side of the frame and the airbag coupling member to prevent direct contact between the frame and a portion of the airbag coupling member.

10. The apparatus of claim 9, wherein the vibration reduction member comprises an elastic washer disposed concentric with the airbag coupling member between the second side of the frame and the locking member to dampen vibration between the airbag coupling member and the frame.

11. The apparatus of claim 9, wherein each bracket has a bottom wall a portion of which protrudes through a corresponding frame opening to the second side of the frame as the vibration reduction member.

12. The apparatus of claim 4, wherein the steering wheel coupling portion comprises a pair of steering wheel connectors at peripheries of the frame, wherein each steering wheel connector includes an extension member in a transverse orientation to a plane of the frame.

13. A system comprising:
a vehicle airbag element;
a frame for supporting the vehicle airbag element;
one or more support assemblies, each support assembly slidably coupled to an opening in the frame, wherein each support assembly comprises an airbag coupling member having a coupling end engaged to the airbag element, the airbag coupling member maintaining a spring member between the frame and the airbag device such that pressing the airbag element towards the frame compresses the spring member therebetween;
a vibration reduction member between the frame and a portion of an airbag coupling member; and an electrical switch assembly coupled to the frame, wherein the electrical switch assembly comprises at least one push button electrical switch for coupling to an electrical circuit,
wherein pressing the airbag element a predetermined distance lowers a portion of at least one of the airbag coupling members towards the frame for urging the airbag element against at least one push button electrical switch in the electrical switch assembly.

14. The system of claim 13, wherein:
the frame includes an essentially planar portion having said openings for slidably receiving a portion of an airbag coupling member of a support assembly transverse to said planar portion of the frame, such that pressing the airbag element towards the frame compresses the spring member and causes at least a portion of said airbag coupling member to slide into the opening for lowering a portion of the airbag element towards the frame; and
the frame comprises a steering wheel coupling portion configured for coupling the frame to a steering wheel.

15. The system of claim 14, wherein each of the support assemblies further comprises a bracket disposed on a corresponding opening on the frame for supporting the airbag coupling member, wherein the bracket includes an opening for slidably receiving an airbag coupling member, and an attachment portion for coupling with the frame.

16. The system of claim 15, wherein:
each support assembly further comprises a locking member at a locking end of the airbag coupling member of that support assembly, distal from said coupling end of the airbag coupling member, for slidably maintaining the frame on the airbag coupling member between the locking member and the airbag element; and
the spring member of the said support assembly is disposed concentric with the airbag coupling member in said bracket to normally urge the locking member against said second side of the frame as the spring member urges the airbag device away from said first side of the frame, such that pressing the airbag device towards the frame with sufficient force compresses the spring member to lower the airbag device towards the frame, wherein the bracket comprises an annular holder partially surrounding the airbag coupling member.

17. The system of claim 16, wherein in each support assembly, the vibration reduction member is between the second side of the frame and the airbag coupling member to prevent direct contact between the frame and a portion of the locking member.

18. The system of claim 16, wherein each bracket has a bottom wall a portion of which protrudes through a corresponding frame opening to the second side of the frame as the vibration reduction member.

19. The system of claim 16, wherein the vibration reduction member comprises an elastic washer disposed concentric with the airbag coupling member between the second side of the frame and the locking member to dampen vibration between the locking member and the frame.

20. An apparatus, comprising:
an airbag device;
an essentially planar frame for supporting the airbag device, the frame having a plurality of openings for slidably receiving a plurality of airbag support assemblies transverse to the frame, the frame further comprising a steering wheel coupling portion configured for coupling the frame to a steering wheel, wherein each support assembly comprises:

an airbag coupling member slidably disposed in a corresponding one of said openings in the frame for maintaining a spring member between the frame and the airbag device, the airbag coupling member having a coupling end protruding from a first side of the frame facing the airbag device for coupling to the airbag device, wherein pressing the airbag device towards the frame compresses the spring member therebetween;

the airbag coupling member having a locking member at a locking end of the airbag coupling member protruding from a second side of the frame opposing said first side, for slidably maintaining the frame on the airbag coupling member between the locking member and the airbag device;

a bracket disposed at said corresponding opening on the frame for receiving the airbag coupling member such that the airbag coupling member is movable relative to the bracket, wherein the bracket comprises an annular holder partially surrounding the airbag coupling member, and the bracket has a bottom wall a portion of which protrudes through a corresponding frame opening to the second side of the frame;

wherein the spring member of each support assembly is disposed in said bracket concentric with said portion of the airbag coupling member protruding from said first side of the frame facing the airbag device;

a vibration reduction member between the frame and the locking member to prevent direct contact between the frame and a portion of the locking member; and an electrical switch assembly coupled to the frame, wherein the electrical switch assembly comprises at least one push button electrical switch for coupling to an electrical circuit.

* * * * *